(12) United States Patent
Srivastava et al.

(10) Patent No.: US 7,028,290 B2
(45) Date of Patent: Apr. 11, 2006

(54) METHOD AND APPARATUS FOR PRIORITIZING SOFTWARE TESTS

(75) Inventors: Amitabh Srivastava, Woodinville, WA (US); Jayaraman Thiagarajan, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 633 days.

(21) Appl. No.: 10/133,427

(22) Filed: Apr. 29, 2002

(65) Prior Publication Data

US 2003/0204836 A1    Oct. 30, 2003

(51) Int. Cl.
*G06F 9/44* (2006.01)

(52) U.S. Cl. .................. 717/124; 717/127; 717/128; 717/161; 712/227

(58) Field of Classification Search ........ 717/124–135, 717/101, 115; 714/38, 724; 716/2, 4; 712/227
See application file for complete search history.

(56) References Cited

U.S. PATENT DOCUMENTS

| | | | | |
|---|---|---|---|---|
| 5,485,621 A * | 1/1996 | Schwanke | ................ | 717/121 |
| 5,822,593 A * | 10/1998 | Lamping et al. | ............ | 717/161 |
| 5,918,037 A * | 6/1999 | Tremblay et al. | ............... | 716/2 |
| 5,933,640 A * | 8/1999 | Dion | ......................... | 717/132 |
| 6,081,914 A * | 6/2000 | Chaudhary | ................ | 714/724 |
| 6,219,829 B1 * | 4/2001 | Sivakumar et al. | ......... | 717/131 |
| 6,330,692 B1 * | 12/2001 | Kamuro et al. | .............. | 714/38 |
| 6,385,741 B1 * | 5/2002 | Nakamura | .................. | 714/38 |
| 6,446,241 B1 * | 9/2002 | Mobley et al. | ................ | 716/4 |
| 6,513,154 B1 * | 1/2003 | Porterfield | .................. | 717/101 |
| 6,675,379 B1 * | 1/2004 | Kolodner et al. | ........... | 717/155 |
| 6,701,514 B1 * | 3/2004 | Haswell et al. | ............. | 717/115 |
| 6,718,535 B1 * | 4/2004 | Underwood | ................ | 717/101 |
| 6,721,941 B1 * | 4/2004 | Morshed et al. | ............ | 717/127 |
| 6,738,893 B1 * | 5/2004 | Rozas | ......................... | 712/24 |
| 6,760,903 B1 * | 7/2004 | Morshed et al. | ............ | 717/130 |
| 6,779,134 B1 * | 8/2004 | Laviolette et al. | ............ | 714/38 |
| 6,941,546 B1 * | 9/2005 | Apuzzo et al. | ............. | 717/135 |
| 2004/0103396 A1 * | 5/2004 | Nehab | ......................... | 717/127 |

OTHER PUBLICATIONS

Rahman, Quality Function Deployment (QFD) in testing, IEE Colloquium on , Apr. 8, 1992, pp.: 6/1-6/7.*
Gupta et al., Priority based data flow testing, IEEE, International Conference on, Oct. 17-20, 1995, pp.: 348-357.*

(Continued)

*Primary Examiner*—Wei Y. Zhen
*Assistant Examiner*—Satish S. Rampuria
(74) *Attorney, Agent, or Firm*—Banner & Witcoff, Ltd.

(57) ABSTRACT

A computer system and method is provided for prioritizing software tests. Software tests are prioritized based on coverage indicators for the software tests and an indication of impacted areas of the software. Each of the coverage indicators indicates which portions of the software are executed for a respective one of the software tests. The portions of the software include at least one of a plurality of blocks. The indication of impacted areas of the software indicates ones of the plurality of blocks that are modified or new with respect to a previous version of the software. A prioritized list of software tests is output. The prioritized list includes at least one test sequence.

37 Claims, 20 Drawing Sheets

OTHER PUBLICATIONS

Jones et al. Test-suite reduction and prioritization for modified condition/decision coverage, IEEE International Conference on, Nov. 7-9, 2001, pp.: 92-101.*

Schneidewind, Setting Maintenance Quality Objectives and Prioritizing Maintenance Work by Using Quality Metrics, IEEE, 1991, pp.: 240-249.*

Hirayama et al., A selective software testing method based on priorities assigned to functional modules, IEEE, Dec. 10-11, 2001 Page(s):259-267.*

Rothermel et al., Test case prioritization: an empirical study, IEEE, Aug. 30-Sep. 3, 1999 Page(s):179-188.*

Mueller, Prioritized token-based mutual exclusion for distributed systems, IEEE, Mar. 30-Apr. 3, 1998 Page(s): 791-795.*

"Test Case Prioritization: A Family of Empirical Studies", by Sebastian Elbaum et al., IEEE Transactions on Software Engineering, vol. 28, No. 2, Feb. 2002, pp. 151-182.

* cited by examiner

METHOD AND APPARATUS FOR PRIORITIZING SOFTWARE TESTS

FIELD OF THE INVENTION

The present invention relates to methods and computer systems for prioritizing a plurality of software tests. More specifically, the invention relates to prioritizing software tests for a later version of previously tested software.

BACKGROUND OF THE INVENTION

Software testing ensures that software has been implemented correctly and performs as intended. Testing new versions of previously tested software helps to ensure that any newly added or revised code has not adversely effected any previously working features.

An important goal of software testing is to expose software defects prior to releasing the software. Defect detection and correction is more costly to fix after the software has been released. Therefore, it is desirable to detect and correct defects before the software is released for customer use. Early defect detection saves time and resources and improves customer relations.

Testing of software occurs continuously throughout the software development process. For example, developers may run some preliminary tests to determine whether new or modified code will prevent the software from being built (compiled and linked). Such tests may involve compiling the code to determine whether any errors, such as the misspelling of a variable name or a syntactical error will prevent compilation or whether the software fails to link correctly due to invalid modules. After the software is built, verification tests are run before the software is released for full testing. Verification tests are not intended to be exhaustive and often must be completed within a limited time.

Full testing is intended to be exhaustive and may be very time consuming. For example, full testing may take days or weeks to run. It is advantageous to detect defects as early as possible, e.g., on day 1 rather than day 21 because early defect detection enables developers to start fixing software defects sooner.

Three approaches were previously proposed for addressing the cost of software testing in terms of time, manpower and computing resources. One approach, test elimination involves test selection and minimization to reduce the number of tests that are executed. A second approach referred to as test prioritization schedules tests in a priority order based on coverage of branches and statements of the source code, probability of exposing faults etc. A hybrid approach combines the two previous techniques by starting first with test elimination using source code changes followed by test prioritization to schedule the selected tests.

A number of studies have been conducted to measure the effectiveness of various test selection techniques. These techniques used source code differencing, data flow analysis, and differences in procedure level entities to identify which parts of the software might be affected by the changes. Data flow analysis is difficult in a programming language such as C++ or C which contains pointers, casts, and aliasing. Data flow analysis is not only expensive, it also does not scale to large commercial programs.

As test elimination techniques remove certain tests, their accuracy must be considered. Although some studies show in certain cases that there is no reduction in fault detection, other studies show that fault detection can be severely compromised due to inaccuracies in test elimination. Although test elimination techniques can be guaranteed safe under certain conditions, these conditions do not always occur.

Another major limitation of test elimination techniques is their inability to be effective when a procedure common to all tests is modified. For example, if the "main" procedure of a program is changed in a program written in C language, no tests will be eliminated. This is true because all tests cause the main procedure to be executed. Therefore, changes in the main procedure will require all tests to be rerun.

An improved technique for prioritizing tests, which avoids the problems discussed above, is desirable.

SUMMARY

The present invention addresses some of the above shortcomings of the prior art by prioritizing software tests such that tests that cause modified or revised code to be executed are prioritized higher than other tests. The more new or revised portions of code that are executed by a test, the higher the priority of the test. As a result, most of the new or revised code can be tested by performing the first few tests. Because errors in upgraded software are more likely to occur in the modified or new portions of the code, the prioritization scheme of the present invention helps to expose defects earlier in the testing process and therefore, allows developers to address and fix the discovered defects sooner.

In a first aspect of the invention, a computer-implemented method is provided for prioritizing software tests. Software tests are prioritized based on coverage indicators for the software tests and an indication of impacted areas of the software. Each of the coverage indicators indicates which portions of the software are executed for a respective one of the software tests. The portions of the software include at least one of a plurality of blocks. The indication of impacted areas of the software indicates ones of the plurality of blocks that are modified or new with respect to a previous version of the software. In a further aspect, a prioritized list of software tests is generated. The prioritized list includes at least one test sequence.

In another aspect of the invention, a medium having instructions stored thereon, is provided. The instructions, when loaded and executed by a processor, cause the processor to prioritize software tests based on coverage indicators for the software tests and an indication of impacted areas of software to be tested. Each of the coverage indicators indicates which portions of the software to be tested are executed for a respective one of the software tests. The portions of the software include at least one of a plurality of blocks. The indication of impacted areas of the software indicates ones of the plurality of blocks that are modified or new with respect to a previous version of the software. In a further aspect, a prioritized list of the software tests is generated. The prioritized list includes at least one test sequence.

In yet another aspect of the invention, a computer system is provided. The computer system includes a prioritizer for prioritizing the software tests based on coverage indicators for the software tests, and an indication of impacted areas of software to be tested. Each of the coverage indicators indicates which portions of the software are executed by a respective one of the software tests. The portions of the software include at least one of a plurality of blocks. The indication of impacted areas of the software indicates ones of the plurality of blocks that are modified or new with respect to a previous version of the software. The computer system also includes an outputter for outputting a prioritized list of the software tests. The prioritized list includes at least one test sequence.

BRIEF DESCRIPTION OF THE DRAWINGS

The present invention is described with respect to the accompanying figures, in which like reference numerals identify like elements, and in which.

DETAILED DESCRIPTION

General Purpose Computer

Figure 1:
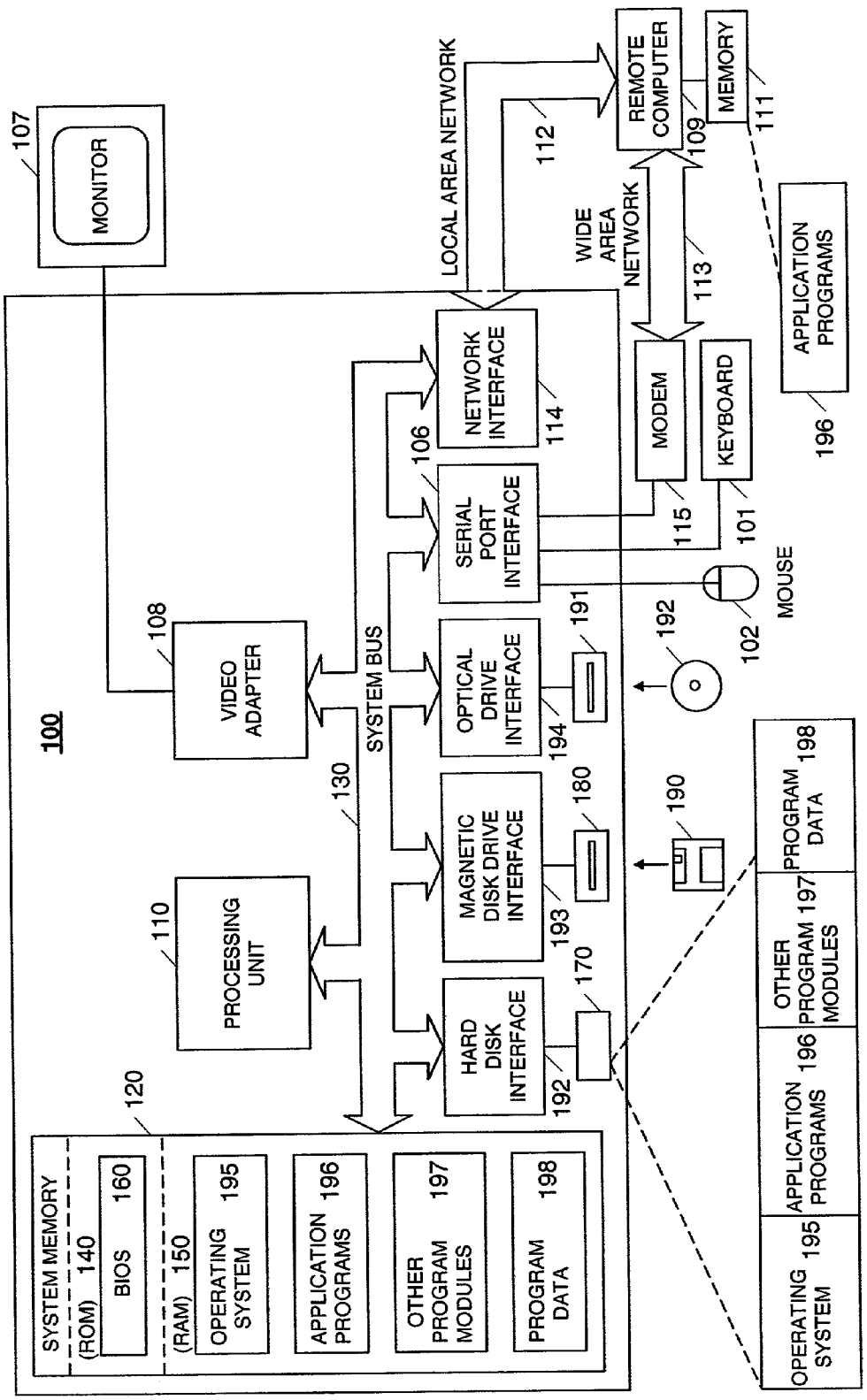
FIG. 1 is a block diagram showing a conventional computer system which can be used to implement an embodiment of the invention.

FIG. 1 is a schematic diagram of a conventional general-purpose digital computing environment that can be used to implement various aspects of the invention. Computer 100 includes a processing unit 110, a system memory 120 and a system bus 130 that couples various system components including the system memory to the processing unit 110. System bus 130 may be any of several types of bus structures including a memory bus or memory controller, a peripheral bus, and a local bus using any of a variety of bus architectures. System memory 120 includes a read only memory (ROM) 140 and a random access memory (RAM) 150.

A basic input/output system (BIOS) 160 containing basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into computer 100 through input devices, such as a keyboard 101 and a pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically include other peripheral output devices (not shown), such as speakers and printers.

Computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, computer 100 is connected to local network 112 through a network interface or adapter 114. When used in a WAN networking environment, personal computer 100 typically includes a modem 115 or other means for establishing a communications over wide area network 113, such as the Internet. Modem 115, which may be internal or external, is connected to system bus 130 via serial port interface 106. In a networked environment, program modules depicted relative to personal computer 100, or portions thereof, may be stored in the remote memory storage device.

Overview

Generally, because software is thoroughly tested before release, most defects in a new version of software usually are due to recent modifications and newly added code. Therefore, software testing should be prioritized, based on the tests that execute (i.e. cause to be executed) the modified or new code.

Figure 2:
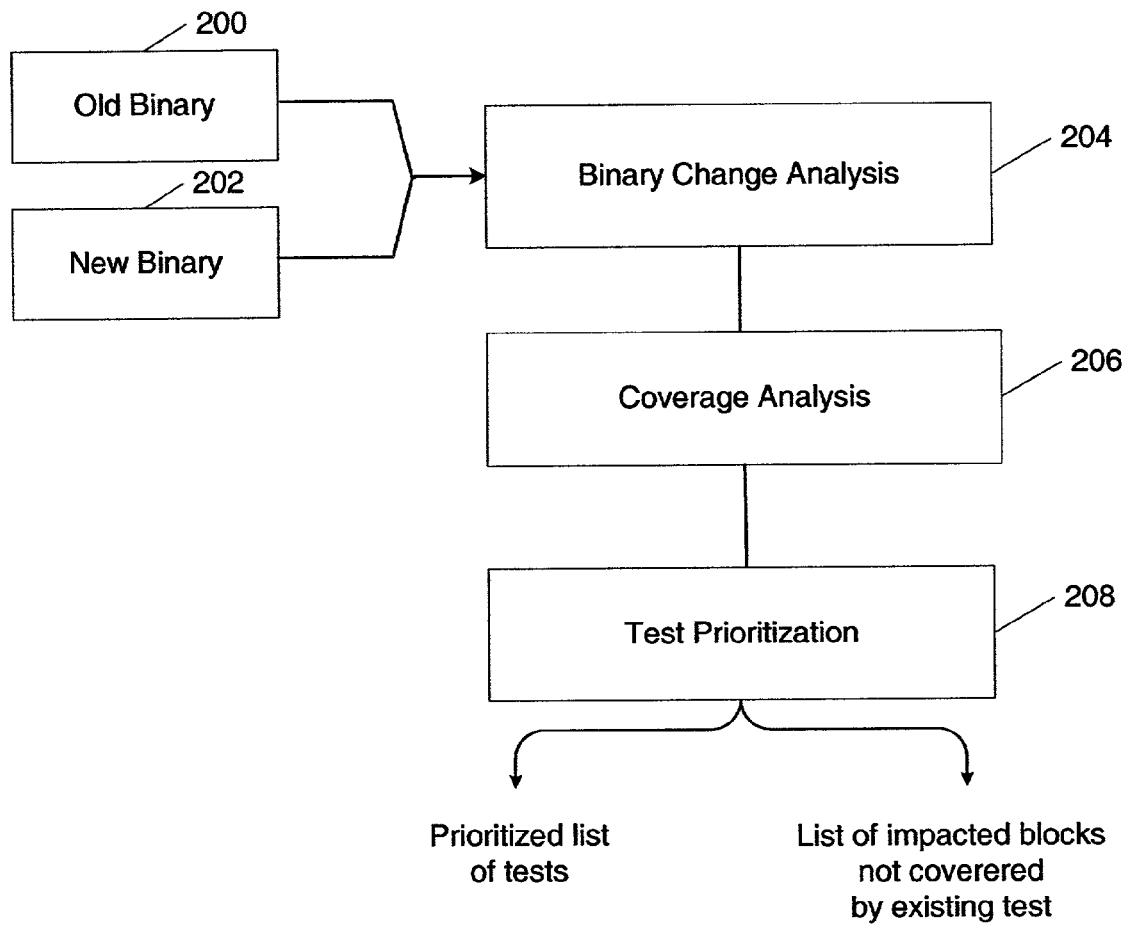
FIG. 2 is a block diagram for providing an overview of an exemplary embodiment of the invention.

FIG. 2 provides an overview of an illustrative embodiment of the invention. Old binary code 200, representing a previously tested version of the software, and new binary code 202, representing a later untested version of the software, are compared via binary change analysis 204.

Binary change analysis 204 may be performed without any knowledge of the changes to the source code. In an illustrative embodiment of the invention, binary change analysis 204 first matches procedures, then blocks within the procedures. Several levels of matching may be performed with varying degrees of fuzziness. Comparison is done at a logical level using symbolic addresses, not hard coded addresses. The process allows correct matches to be found even when addresses are shifted, different register allocation is used, and small program modifications are made. Matching blocks are further compared to determine whether they are identical (old) or modified and are marked accordingly. Unmatched blocks are designated and marked as new. Impacted blocks are the set of modified and new blocks, i.e., the blocks that have changed or are newly added in the new binary code as compared to the old binary code.

A block is defined as one or more program instructions that has only one entry point and only one exit point. In an illustrative embodiment of the invention, the block includes machine language instructions in binary form (binary code).

Figure 3:
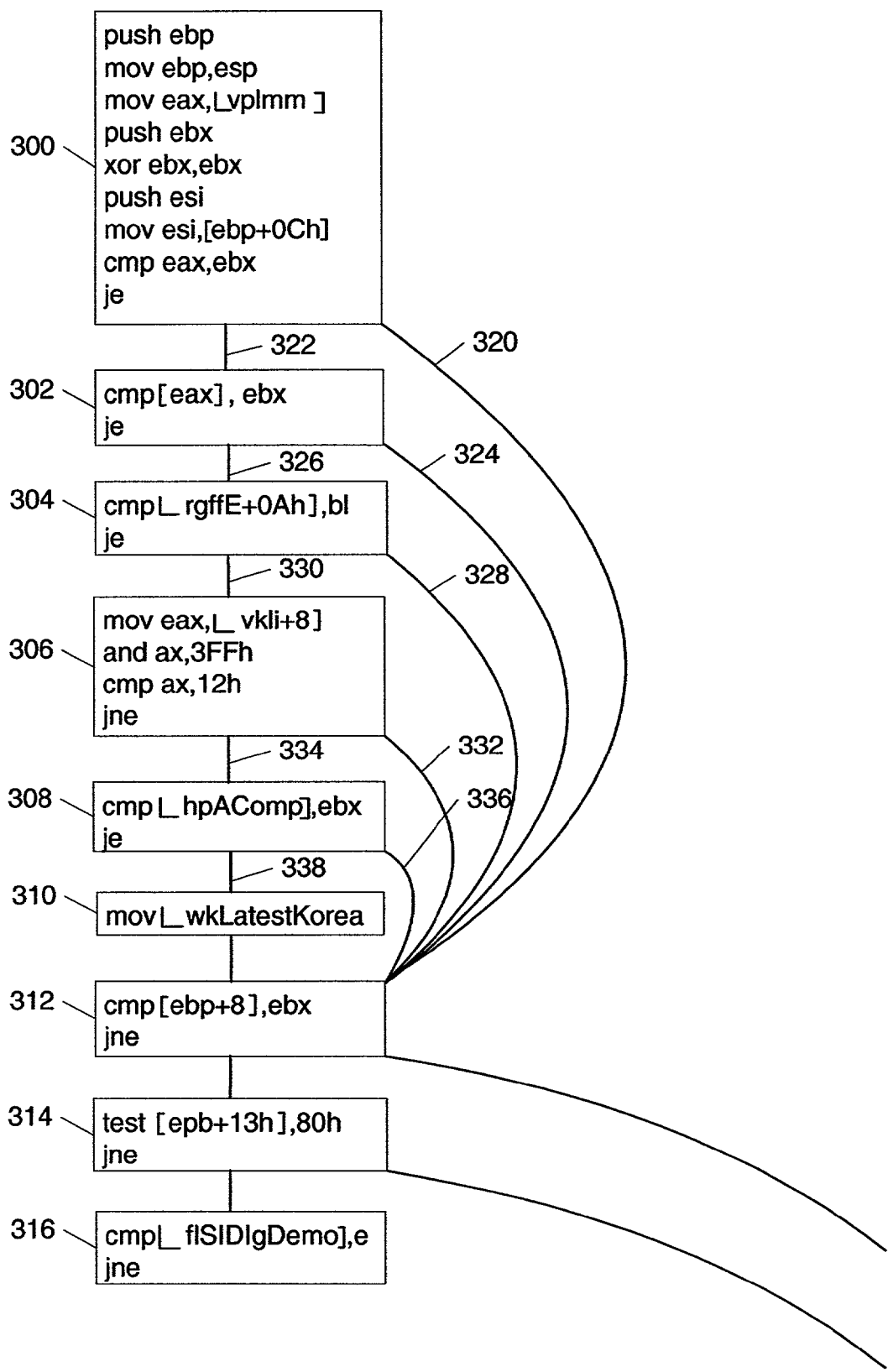
FIG. 3 shows a portion of code and helps to illustrate blocks and arcs.

Referring to FIG. 3, blocks 300, 302, 304, 306, 308, 310, 312, 314 and 316 are shown. Each block includes assembler language code, wherein each assembler language instruction corresponds to one instruction in binary code. In each of the blocks, each of the instructions is executed in sequence until the last instruction is executed. For example, in block 300 each instruction is executed until the last instruction of the block, "je", is executed. The instruction "je" is a conditional jump instruction that will cause execution of the program to branch or jump to another memory location when the tested condition is true. Similarly, in each of the remaining blocks shown in FIG. 3, the instructions are executed in sequence until the last instruction of the block, a conditional jump instruction, is executed. Thus, each block has a single entry point, the first instruction of the block, and a single exit point, the last instruction of the block.

Referring back to FIG. 2, coverage analysis 206 is performed after binary change analysis 204. Coverage analysis 206 accesses coverage indicators pertaining to the software tests. The coverage indicators indicate, for each test, which of the blocks are executed. This information can be obtained during execution of software tests for a previous version of the software by inserting checkpoints into the blocks of the software, executing the software tests, collecting information generated by the checkpoints and storing the resulting data in, for example, a database. Thus, the checkpoints notify a monitoring program every time the checkpoints are accessed. Coverage analysis 206 determines whether a new block is executed by determining whether at least one predecessor block and at least one successor block of the new block are executed by any of the software tests, skipping any intermediate new blocks. If so, the coverage indicators are updated to reflect that the software tests associated with the predecessor and successor blocks execute the new block.

Alternatively, coverage analysis 206 may determine that a new block is executed by a software test by determining whether any software tests execute at least one successor block, skipping any intermediate new blocks. If the at least one successor block is executed, then the coverage indicator for any of the software tests that execute the successor block is updated to reflect that the software test also executes the new block.

Another alternative method of performing coverage analysis is to examine arc coverage. An arc is defined as a branch. For example, FIG. 3 shows arcs 320, 322, 324, 326, 328, 330, 332, 334, 336 and 338. After block 300 is executed, either block 302 or block 312 will be executed, depending on whether the branch defined by arc 320 or arc 322 is taken. Similarly, after block 302 is executed, either block 304 or block 312 will be executed, depending on whether the branch defined by arc 324 or arc 326 is taken.

By using checkpoints, as discussed previously, data can be collected to determine which branches or arcs are taken when particular software tests are executed. Similar to new blocks, new arcs are arcs which cannot be matched to an arc in the previous version of the software. A new arc is determined to be taken when the blocks at both ends of the arcs are determined to be executed. In this case, the software tests that cause either the predecessor or the successor blocks of the arc to be executed have coverage indicators indicating that the software tests execute the arc. Alternatively, a new arc is determined to be taken when a successor block, i.e., the block to which the arc branches, is executed. The coverage indicators, in this case, indicate that a software test causes the arc to be taken when the software test causes the successor block to be executed.

Test Prioritization 208 receives the coverage indicators and coverage information regarding impacted portions of the software, i.e., coverage information regarding modified or new blocks or arcs, and prioritizes the tests. No test elimination is performed. The tests with the most coverage of impacted portions of the software will be listed for execution first, while tests that cover little or no impacted portions will be listed for execution later.

Test prioritization 208 causes a prioritized list of tests to be generated and output. Test prioritization 208 may also cause a list of impacted portions of the software that are not covered by existing tests to be identified and listed in an output so that software tests could be developed to cover these portions of the software.

Prioritization—Block Coverage

Figure 4:
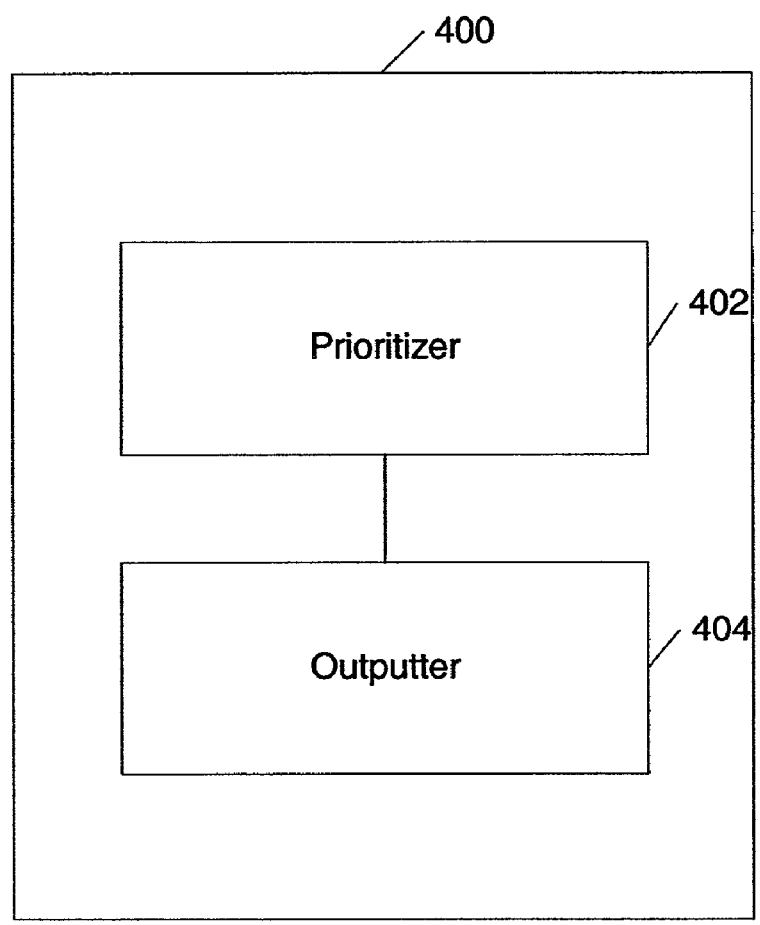
FIG. 4 is a functional block diagram of an illustrative embodiment of the invention.

Referring to a functional block diagram of FIG. 4, an illustrative system 400 is shown. System 400 includes prioritizer 402 for prioritizing the software tests and outputter 404 for outputting a prioritized list of tests. Outputter 404 may also output a list of impacted portions not covered by tests. Prioritizer 400 and outputter 404 may each comprise an application program 196, a portion of application program 196, or machine-readable instructions on a medium, such as, for example, removable magnetic disk 190 or removable optical disk 192. Application program 196 and the machine-readable instructions of removable magnetic disk 190 or removable optical disk 192 may be executed by processing unit 110.

Figure 5:
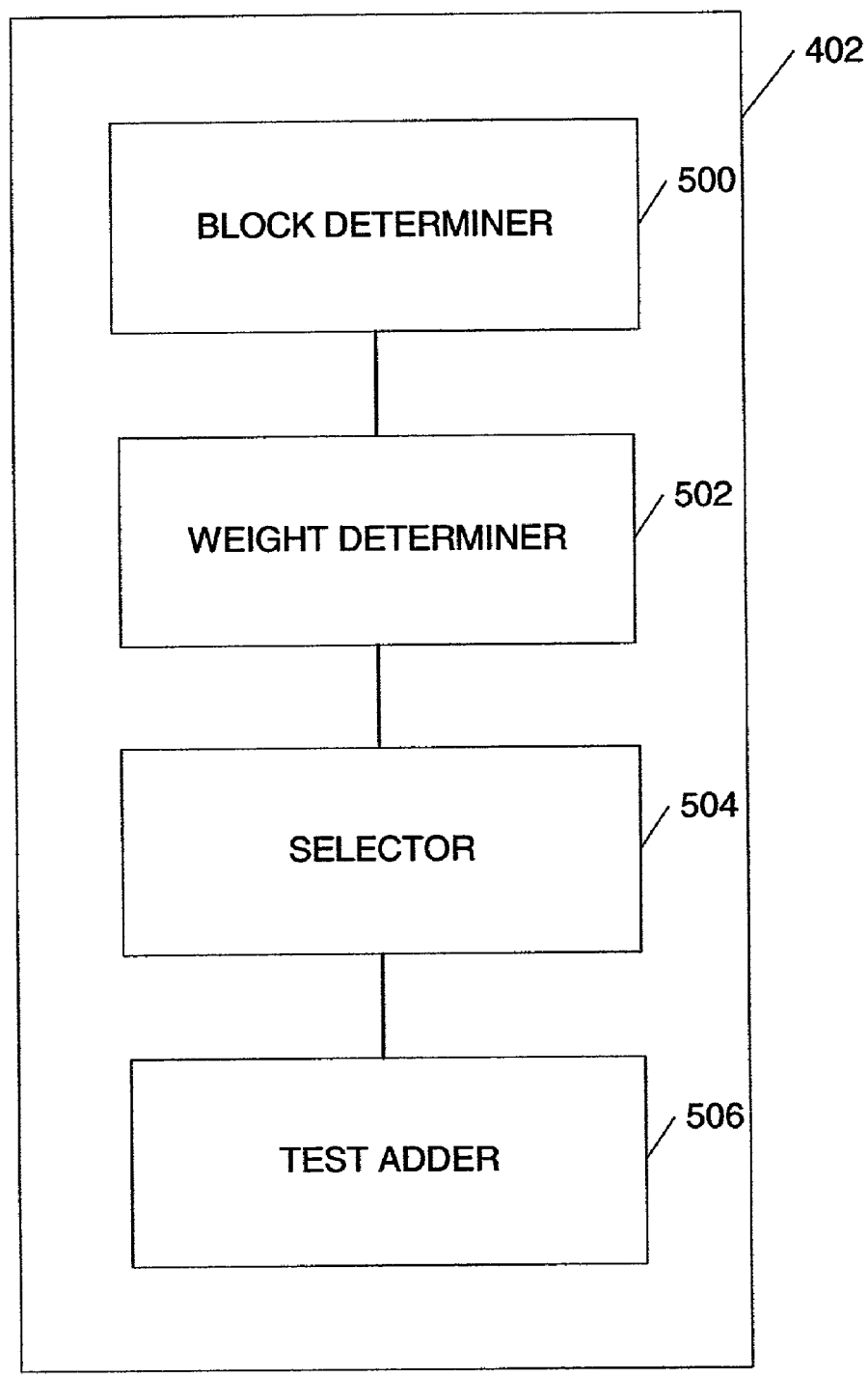
FIG. 5 is a functional block diagram showing a detailed view of the prioritizer of FIG. 4.

FIG. 5 illustrates a functional block diagram of prioritizer 402 shown in FIG. 4. Block determiner 500 determines whether any blocks exist that are not executed for any of the software tests. If such blocks are found, a list of the blocks may be provided to outputter 404 for listing. Weight determiner 502 determines weights for each of the software tests. The weights can be used to prioritize the software tests, as explained below. Selector 504 selects the test having the largest weight. Test adder 506 adds the test to the current test sequence. Block determiner 500, weight determiner 502, selector 504, and test adder 506 may each be a portion of an application program 196 or may be machine-readable instructions on a medium, such as, for example, removable magnetic disk 190 or removable optical disk 192. Application program 196 and the machine-readable instructions of removable magnetic disk 190 or removable optical disk 192 may be executed by processing unit 110.

Figure 6A:
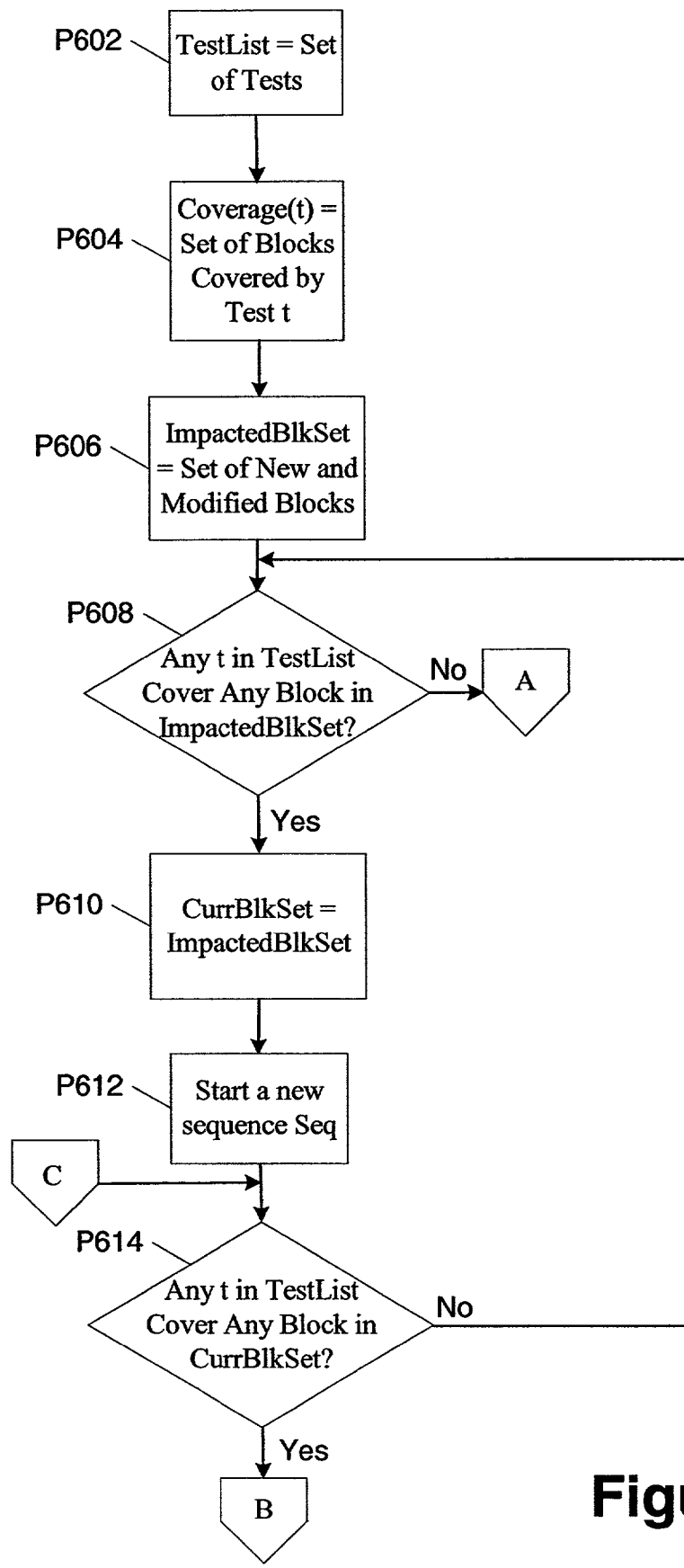
FIGS. 6A–6C are respective portions of a flowchart illustrating processing according to an illustrative embodiment of the invention.
Figure 6B:
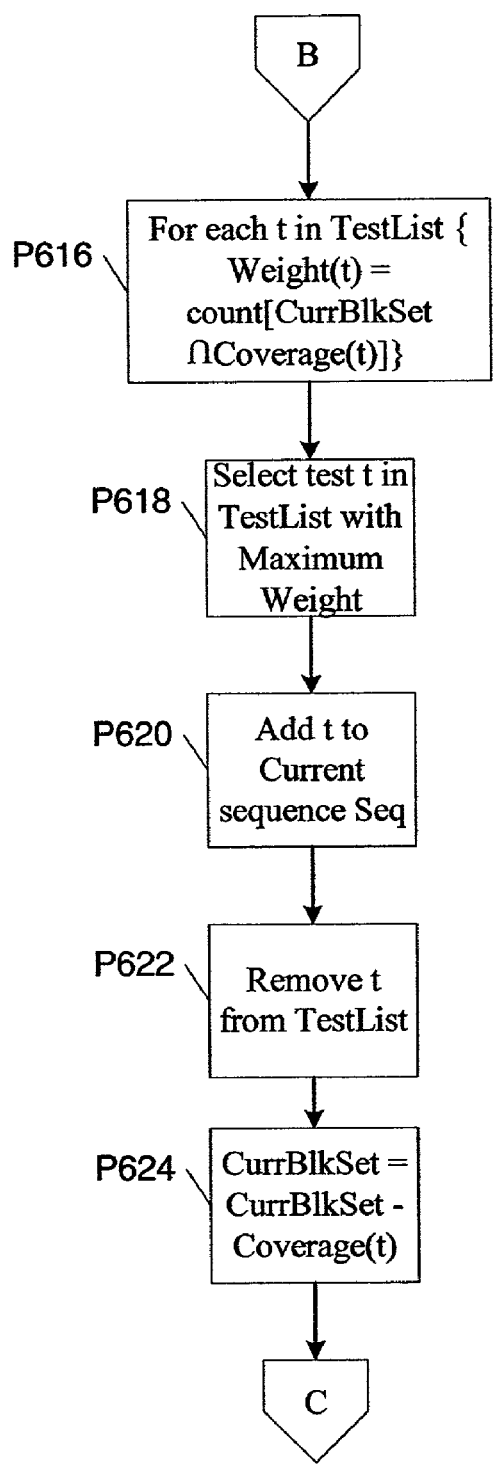
Figure 6C:
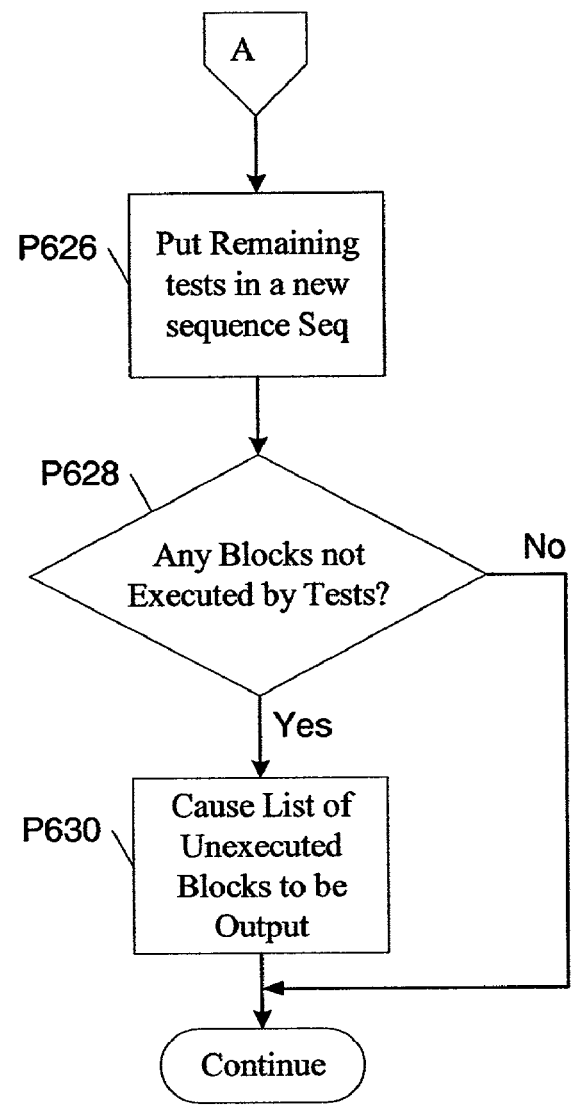

Referring now to the flowchart of FIGS. 6A–6C, a method according to an illustrative embodiment of the invention is explained. In this embodiment, tests are prioritized based on new or modified blocks covered by each test, as indicated by coverage indicators and impacted portions of the software.

Initialization occurs at steps P602 through P606. At P602, TestList is initialized to include a complete set of all of the tests. At P604, coverage(t) is set equal to the set of blocks covered by test t, where t corresponds to each of the software tests. At P606, ImpactedBlkSet is set equal to all of the new and modified blocks.

At P608, a determination is made as to whether any tests t in TestList cover any block in ImpactedBlkSet. This can be performed by determining, for each test t, whether any of the blocks indicated by coverage(t) for any test t, also appear in ImpactedBlkSet. If so, execution continues at P610.

At P610, CurrBlkSet is set equal to ImpactedBlkSet and at P612, a new test sequence is started.

At P614, a determination is made as to whether any test t in TestList cover any block in CurrBlkSet. This determination can be made by comparing coverage(t) for the tests with the set of tests in TestList. If any of the tests t in TestList are found to cover any block in CurrBlkSet, then P616 will be performed next. Otherwise, the determination at P608 will be performed next.

At P616, the weight, W(t), for each test t in TestList is computed. This is performed by counting the number of blocks that appear in CurrBlkSet that are covered by each test t in TestList.

At P618, the test t having the maximum weight is selected. At P620, the selected test is added to the current sequence Seq. At P622, the selected test is removed from TestList and at P624, the blocks covered by the selected test are removed from CurrBlkSet. The method continues at P614, as described above.

P626 is performed when, at P608, it is determined that no test t in TestList covers any block in ImpactedBlkSet. At P626, any remaining tests are included in a new test sequence.

At P628 a check is made to determine whether any blocks are not executed by any tests. If so, at P630 a list of unexecuted blocks is output.

In the above flowchart, block determiner 500 may perform steps P628 and P630, weight determiner 502 may perform steps P602 through P616, selector 504 may perform step P618, and test adder 506 may perform steps P620 through P624.

Referring to an example shown in FIG. 7, the method is further explained with reference to the flowchart of FIGS. 6A–6C. Tests T1 through T5 are the software tests under consideration in this example. For simplicity, the impacted block map shows all blocks as being impacted.

Initialization is performed according to steps P602 through P606. TestList is set to equal the tests (T1, T2, T3, T4, and T5). Coverage(T1) is set to blocks (1, 3, 5, 6, and 7). Coverage(T2) is set to blocks (2 and 4). Coverage(T3) is set to blocks (1, 3, 5, and 7). Coverage(T4) is set to block (7). Coverage(T5) is set to blocks (5, 6, and 7). ImpactedBlkSet is set to blocks (1, 2, 3, 4, 5, 6, and 7).

At P608, a check is made to determine whether any of the tests in TestList cover any block in ImpactedBlkSet. At this point, all the tests in TestList covers blocks in ImpactedBlkSet. Therefore, P610 will be performed next. At P610, CurrBlkSet is set equal to ImpactedBlkSet. At this point, CurrBlkSet is set equal to blocks (1, 2, 3, 4, 5, 6, and 7) and at P612, a new test sequence is started. At this point the first test sequence, set 1, is started.

At P614, a check is made to determine whether any of the tests in TestList cover any block in CurrBlkSet. At this point, all the tests in TestList cover blocks in CurrBlkSet. Therefore, P616 will be performed next.

At P616, the weight W will be computed for each test in TestList by counting the number of blocks covered for each test, wherein the covered block is also included in CurrBlkSet. At this point, CurrBlkSet=blocks (1, 2, 3, 4, 5, 6, and 7). Therefore, all of the covered blocks of tests T1 through T5 are counted. Thus, the weights for each test are 5 for T1, 2 for T2, 4 for T3, 1 for T4, and 3 for T5, as shown by the first column under weights in FIG. 7.

At P618, comparing the weights, the weight 5 for T1 is determined to be the largest weight. Therefore, test T1 is selected and at P620, test T1 is added to the current sequence, Set 1.

At P622, test T1 is removed from TestList and at P624, the blocks covered by test T1 are removed from CurrBlkSet. That is, TestList is now equal to tests (T2, T3, T4, and T5) and CurrBlkSet is now equal to blocks (2 and 4).

P614 is performed next to determine whether any tests in TestList cover any blocks in CurrBlkSet. That is, do any of tests T2, T3, T4, and T5 cover blocks 2 or 4. Referring to FIG. 7, it can be seen that test T2 satisfies this condition. Therefore, P616 will be performed next.

At P616, weights will be calculated for tests T2, T3, T4, and T5. Test T2 covers blocks 2 and 4, which are included in CurrBlkSet. Therefore test T2 has a weight of 2. Tests T3 through T5 do not cover any blocks in CurrBlkSet, i.e., blocks 2 and 4, and therefore, have a weight of 0. The weights are shown in the second column from the right, under weights in FIG. 7.

At P618, comparisons determine that test T2 has the largest weight, 2 and at P620, test T2 is added to the current test sequence, Set 1.

At P622, test T2 is removed from TestList and the tests covered by test T2 are removed from CurrBlkSet. That is, Testlist now equals (T3, T4 and T5) and CurrBlkSet now equals blocks ( ) (the null set). P614 will be performed next.

P614 is performed next to determine whether any tests in TestList cover any blocks in CurrBlkSet. That is, whether any of tests T3, T4, and T5 covers no blocks. Because this condition cannot be satisfied, P608 will be performed next.

At P608, a check is made to determine whether any tests in TestList cover any blocks in ImpactedBlkSet. That is, do any of tests T3, T4, and T5 cover any of blocks 1, 2, 3, 4, 5, 6, and 7. With reference to FIG. 7, one can easily observe that any of tests T3, T4 and T5 satisfy this condition. Therefore, P610 will be performed next.

At P610 CurrBlkSet is set to ImpactedBlkSet. That is, CurrBlkSet is set to blocks (1, 2, 3, 4, 5, 6, and 7). At P612 a new sequence, set 2, is started.

P614 is performed next to determine whether any tests in TestList covers any blocks in CurrBlkSet. That is, whether any of tests T3, T4, and T5 covers any of blocks 1, 2, 3, 4, 5, 6, and 7. With reference to FIG. 7, one can easily see that all of tests T3, T4 and T5 satisfy this condition. Therefore, P616 will be performed next.

At P616, weights will be calculated for tests T3, T4, and T5. Test 3 covers blocks 1, 3, 5 and 7 and therefore, a weight of 4 is computed for test T3. Test 4 covers block 7 and therefore, a weight of 1 is computed for test T4. Test 5 covers blocks 5, 6, and 7, and therefore, a weight of 3 is computed for test T5. The weights can be seen in the third column from the left, under weights in FIG. 7.

At P618, test T3, having a weight of 4, is determined to be the test with the maximum weight and therefore, test T3 is selected. At P620 test T3 is added to the current sequence, set 2, as can be seen in FIG. 7.

At P622, test T3 is removed from TestList and at P624, the blocks covered by test T3 are removed from CurrBlkSet. Thus, TestList is now equal to (T4 and T5) and CurrBlkSet is now equal to blocks (2, 4, and 6). P614 will be performed next.

P614 is performed next to determine whether any tests in TestList cover any blocks in CurrBlkSet. That is, do any of tests T4 and T5 cover any of blocks 2, 4, and 6. With reference to FIG. 7, one can easily see that test T5 satisfies this condition. Therefore, P616 will be performed next.

At P616, weights will be calculated for tests T4 and T5. Test T4 covers block 7, which is not included in CurrBlkSet. Therefore, T4 has a weight of 0. T5 covers blocks 5, 6, and 7, but only block 6 is included in CurrBlkSet. Therefore, T5 has a weight of 1. The weights can be seen in FIG. 7 as the fifth column from the left, under weights.

At P618, test T5 is determined to be the test with a maximum weight of 1, as compared to T4, which has a weight of 0. Consequently, at P620, test T5 is added to the current test sequence, set 2, as can be seen in FIG. 7.

At P622, test T5 is removed from TestList and at P624, block 6, the block covered by Test T5, is removed from CurrBlkSet. Thus, TestList now equals (T4) and CurrBlkSet now equals blocks ( ) (the null set). P614 is performed next.

At P614, a determination is made as to whether any tests in TestList cover any blocks in CurrBlkSet. Because CurrBlk equals the null set, this condition cannot be satisfied and P608 will be performed next.

At P608, a check is made to determine whether any tests in TestList cover any blocks in ImpactedBlkSet. That is, does test T4 cover any of blocks 1, 2, 3, 4, 5, 6, and 7? With reference to FIG. 7, one can easily observe that test T4 satisfy this condition with respect to block 7. Therefore, P610 will be performed next.

At P610 CurrBlkSet is set to ImpactedBlkSet. That is, CurrBlkSet is set to blocks (1, 2, 3, 4, 5, 6, and 7). At P612 a new sequence, set 3, is started.

P614 is performed next to determine whether any tests in TestList cover any blocks in CurrBlkSet. That is, whether any of test T4 covers any of blocks 1, 2, 3, 4, 5, 6, and 7. With reference to FIG. 7, one can easily see that test T4 satisfy this condition with respect to block 7. Therefore, P616 will be performed next.

At P616, a weight will be calculated for test T4. Test T4 covers block 7 and has a weight of 1. No other weight is computed for other tests. The weight can be seen in FIG. 7 as the fifth column from the left, under weights.

At P618, test T4, having a weight of 1, is determined to be the test with the maximum weight. In fact, T4 is the only test with a weight. Therefore, test T4 is selected. At P620 test T4 is added to the current sequence, set 3, as can be seen in FIG. 7.

At P622, test T3 is removed from TestList and at P624, the blocks covered by test T3 are removed from CurrBlkSet. Thus, TestList is now equal to ( ) (the null set) and CurrBlkSet is now equal to blocks (1, 2, 3, 4, 5, and 6). P614 will be performed next.

At P614, because no tests remain in TestList, the condition cannot be satisfied and P608 is performed next.

At P608, because no tests remain in TestList, this condition cannot be satisfied and P626 is performed next. At P626 remaining tests are added to a new sequence; however, in this case, no tests remain.

At P628 a check is made to determine whether any blocks are not executed as a result of performing any of the tests. If any blocks are not executed by the tests, then P630 is performed to cause the list of unexecuted blocks to be output; however, in this example, all blocks are executed by the tests.

Variations of Prioritizing—Tie Breaking

Figure 7:
FIG. 7 illustrates an example of tests, coverage indicators, and an indication of impacted areas of the software for explaining a method according to an illustrative embodiment of the invention.

In the above example of FIG. 7, a test with a maximum weight was always easy to determine; however, it is possible for two or more tests to have the same maximum weight. That is, two or more tests may have the same weight, which is greater than the weights of other tests under consideration. When this occurs, several other factors may be considered in order to break the tie.

Figure 8:
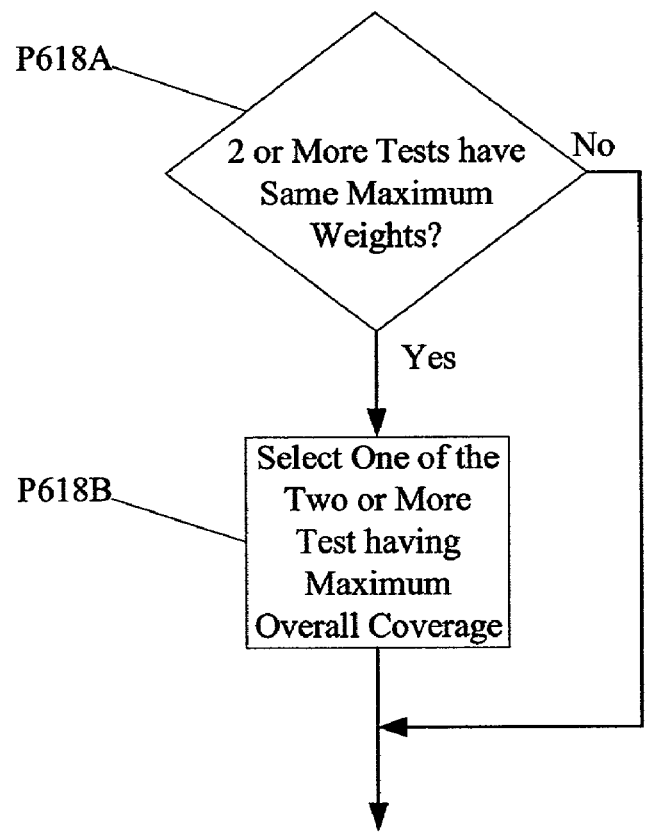
FIG. 8 is a portion of a flowchart that illustrates processing in an illustrative variation of an embodiment of the invention when two or more tests have the same maximum computed weight.

For example, information concerning maximum overall coverage of the software with regard to each software test may be maintained by using checkpoints and collecting coverage data One of the two or more tests having the same weight and the maximum overall coverage may be selected to break the tie. FIG. 8 shows a portion of a flowchart for replacing step P618 of the flowchart of FIG. 6B for implementing this variation of the embodiment. At P618A, a check is performed to determine whether two or more tests have the same maximum weight. If the condition is true, P618B is performed to determine which one of the two or more tests has the maximum overall coverage of the software. The one of the two or more tests having the maximum overall coverage is selected.

Figure 9:
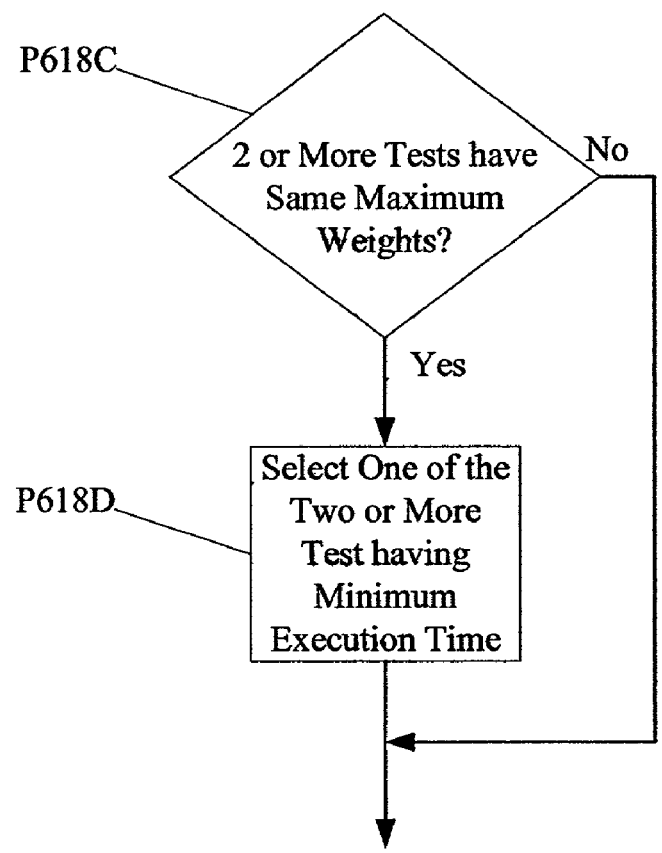
FIG. 9 is a portion of a flowchart that illustrates processing in another variation of an embodiment of the invention two or more tests have the same maximum computed weight.

In another variation, data concerning execution time of the tests may be maintained. When a tie occurs, the one of the two or more tied tests having the shortest execution time is selected. FIG. 9 shows a portion of a flowchart for replacing step P618 of the flowchart of FIG. 6B for implementing this variation of the embodiment. At P618C, a check is performed to determine whether two or more tests have the same maximum weight. If the condition is true, P618D is performed to determine which one of the two or more tests has the shortest execution time. The one of the two or more tests having the shortest execution time is selected.

Prioritization—Arc Coverage

Figure 10:
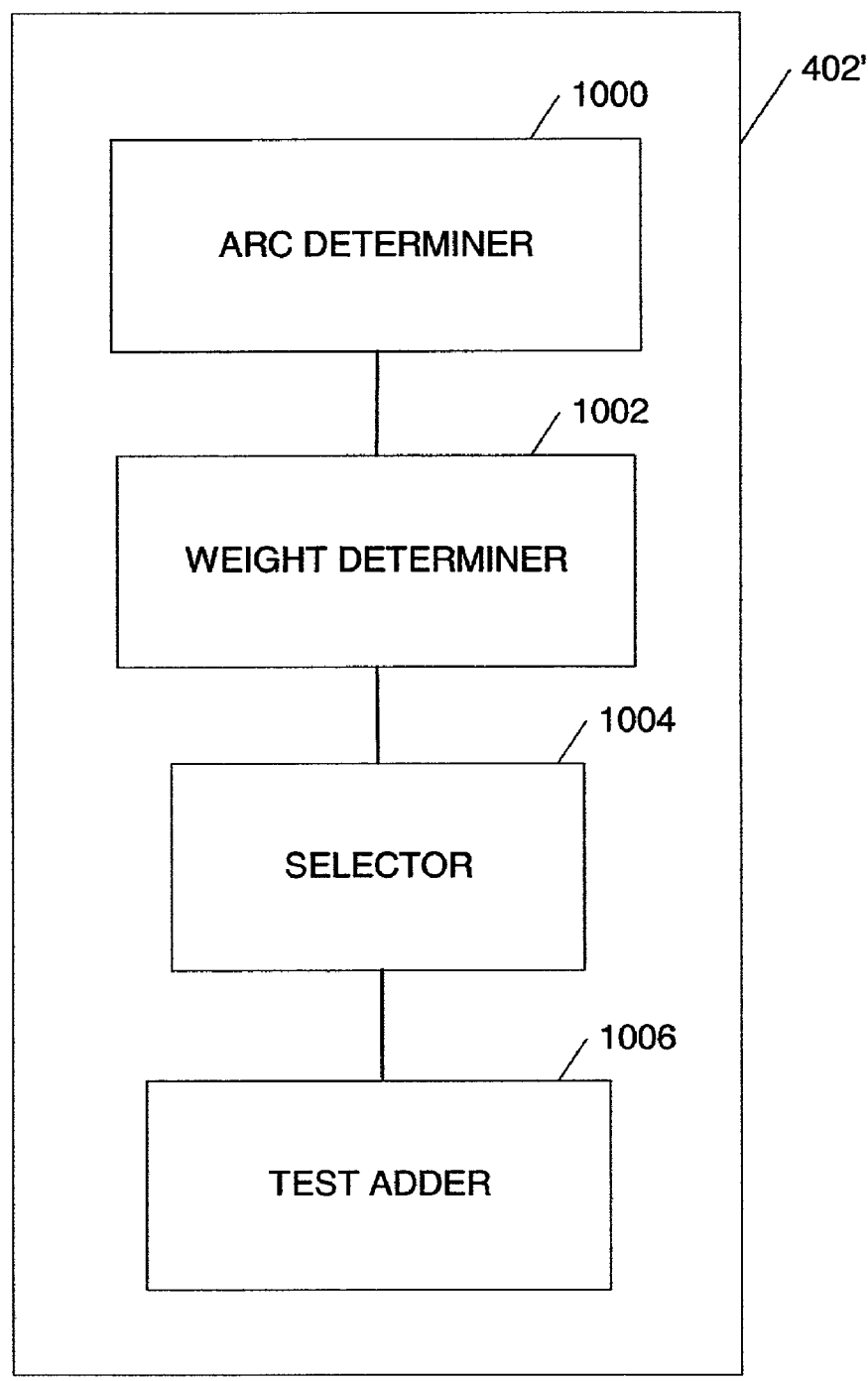
FIG. 10 illustrates a functional block diagram of a prioritizer according to an exemplary embodiment of the invention.

Referring to a functional block diagram shown in FIG. 10, a variation 402" of the prioritizer 402 of FIG. 4 is shown. Arc determiner 1000 determines whether any arcs exist that are not taken by any of the software tests. If such arcs are found, a list of the arcs may be provided to outputter 404 for listing. Weight determiner 1002 determines weights for each of the software tests. The weights are used to prioritize the software tests as explained below. Selector 1004 selects the test having the largest weight. Test adder 1006 adds the test to the current test sequence.

Figure 11A:
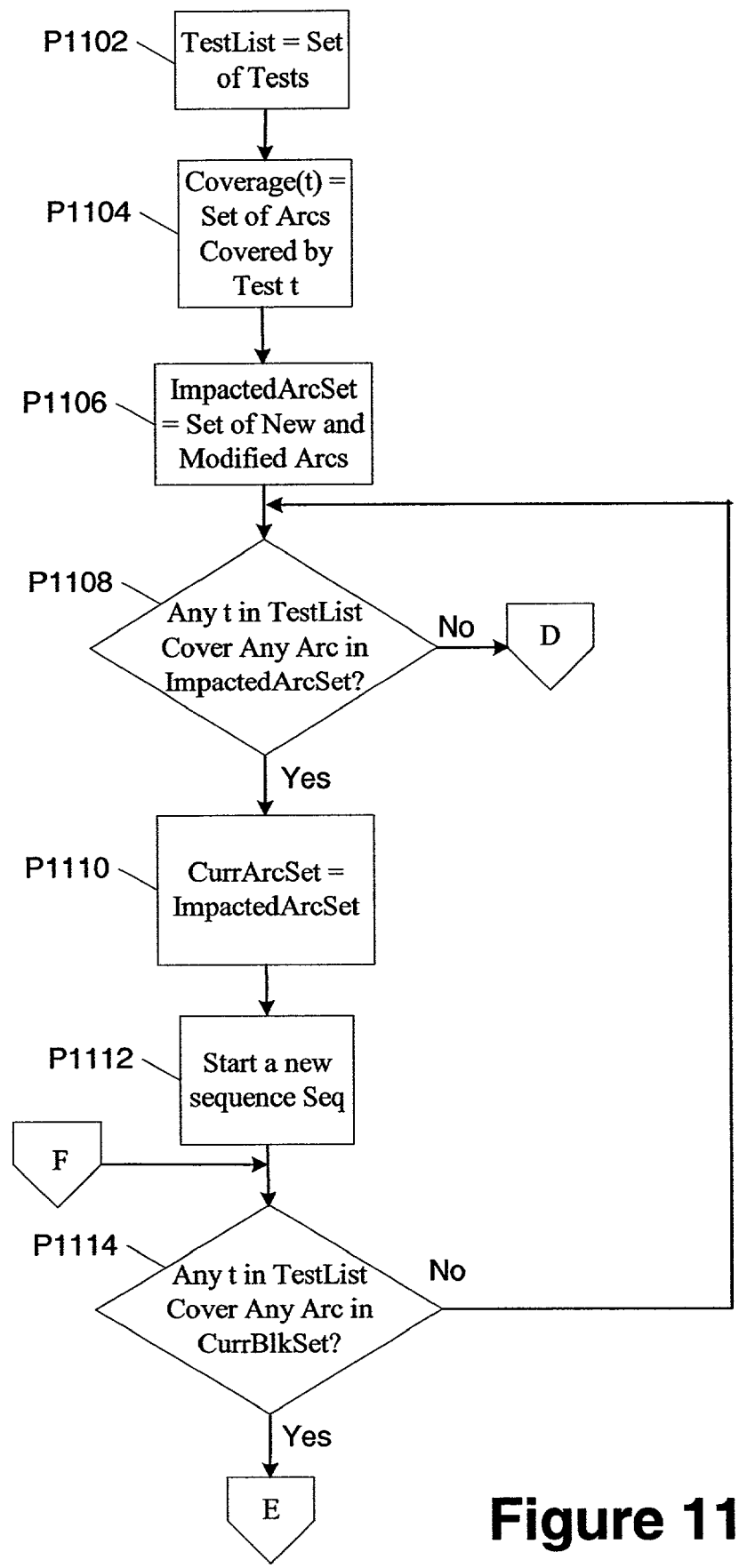
FIGS. 11A–11C are respective portions of a flowchart illustrating processing in the exemplary embodiment of FIG. 10.
Figure 11B:
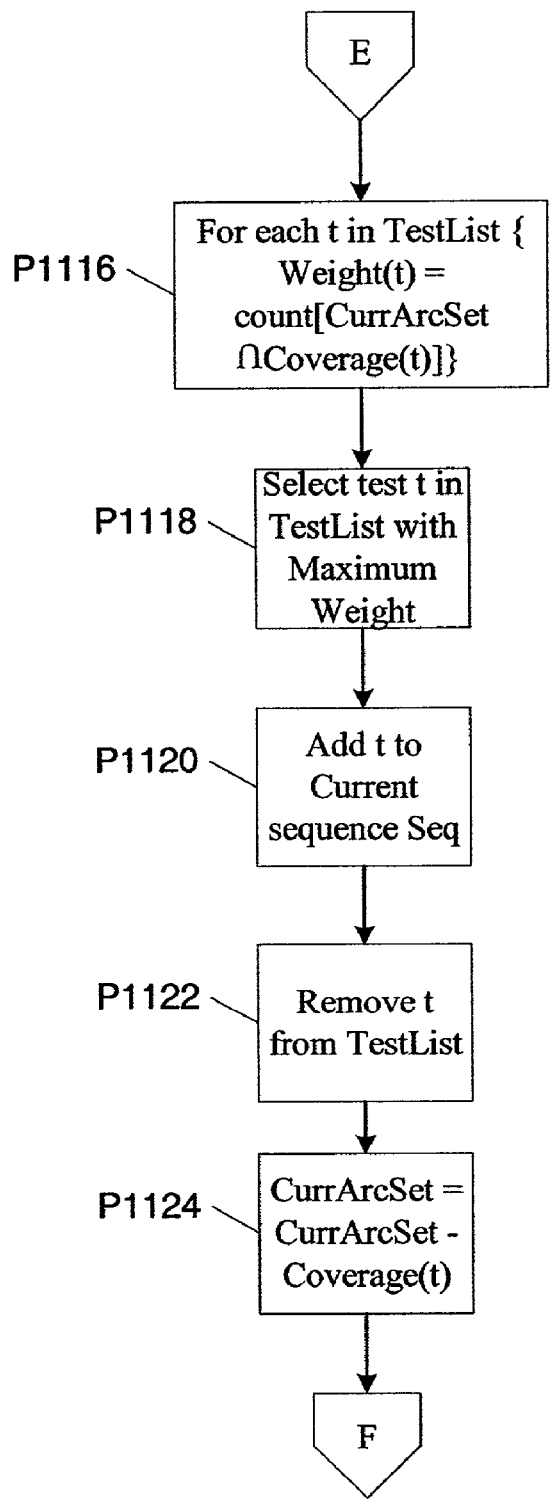
Figure 11C:
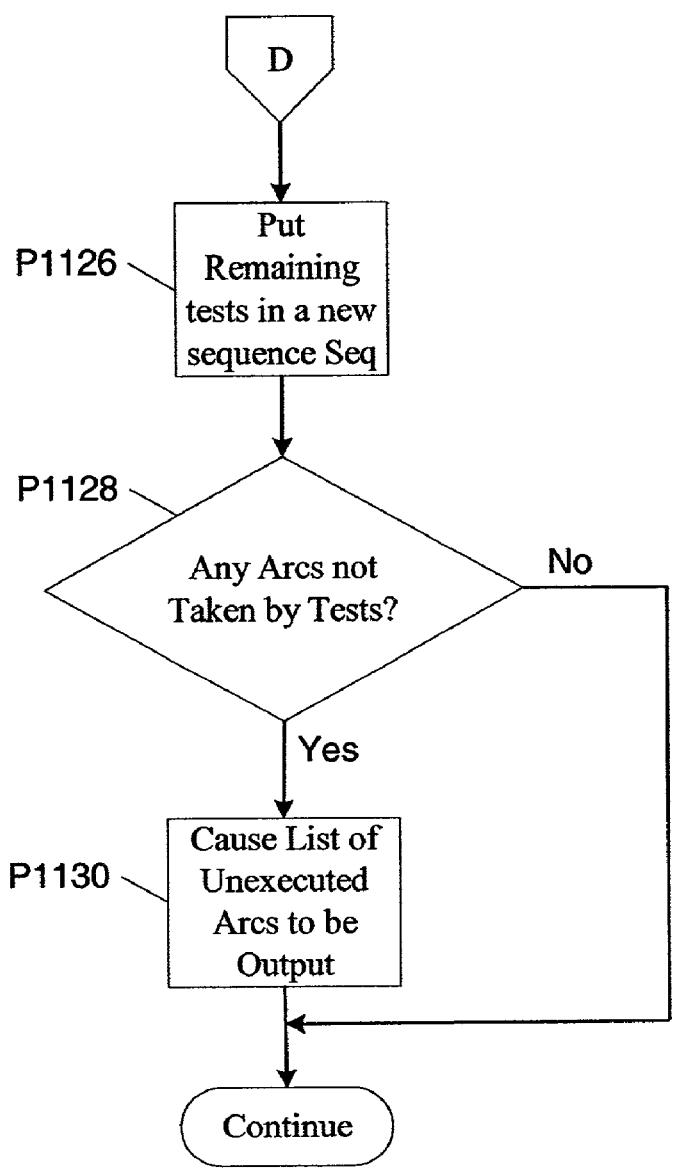

Referring now to the flowchart of FIGS. 11A–11C, a method according to another illustrative embodiment of the invention is explained. In this embodiment, tests are prioritized based on new or modified arcs covered by each test, as indicated by coverage indicators and an indication of impacted portions of the software.

Initialization occurs at steps P1102 through P1106. At P1102, TestList is initialized to include a complete set of all of the tests. At P1104, coverage(t) is set equal to the set of arcs covered by test t, where t corresponds to each of the software tests. At P1106, ImpactedArcSet is set equal to all of the new and modified arcs.

At P1108, a determination is made as to whether any tests t in TestList covers any arc in ImpactedBlkSet. This step can be performed by determining, for each test t, whether any of the arcs indicated by coverage(t) for any test t, also appear in ImpactedArcSet. If so, execution continues at P1110.

At P1110, CurrArcSet is set equal to ImpactedArcSet and at P1112, a new test sequence is started.

At P1114, a determination is made as to whether any test tin TestList cover any arc in CurrArcSet. This determination can be made by comparing coverage(t) for the tests with the set of tests in TestList. If any of the tests t in TestList are found to cover any arc in CurrArcSet, then P1116 will be performed next. Otherwise, the determination at P1108 will be performed next.

At P1116, the weight, W(t), for each test t in TestList is computed by counting the number of arcs that appear in CurrArcSet that are covered by each test t in TestList.

At P1118, the test t having the maximum weight is selected. At P1120, the selected test is added to the current sequence Seq. At P1122, the selected test is removed from TestList and at P1124, the arcs covered by the selected test are removed from CurrArcSet. The method continues at P1114, as described above.

P1126 is performed when, at P1108, it is determined that no test tin TestList covers any arc in ImpactedArcSet. At P1126, any remaining tests are included in a new test sequence.

At P1128 a check is made to determine whether any arcs are not executed by any tests. If arcs are not executed by the tests, at P1130 a list of unexecuted arcs is output.

In the above flowchart, arc determiner 1000 may perform steps P1128 and P1130, weight determiner 1102 may perform steps P1102 through P1116, selector 1104 may perform step P1118, and test adder 1106 may perform steps P1120 through P1124.

The tie breaking strategies mentioned above may also be applied to this embodiment. For example, if two or more tests have the same maximum weight, other factors, such as maximum overall test coverage or minimum execution time may be considered and a selection made among the arcs having the same maximum weight, as similarly described previously.

It will be appreciated by one skilled in the art that any performance-based criterion may be used in the tie breaking procedure described above.

Prioritization—Weighting

In a variation of the illustrative arc coverage and block coverage embodiments described above, weighting may be modified to include other factors. For example, performance data may be used to add to the computed weight for each of the software tests. Performance data may be collected during execution of the software tests in a previous version of the software. When determining coverage of the blocks or arcs by the software tests, if a block or arc is determined to be in a portion of the program that is performance critical, a performance critical indicator may be stored with the block or arc coverage information for the software test. Thus, when a test is determined to cover a block or arc that is in a performance critical portion of the software, a predefined value may be added to the weight for the test.

As an example of this variation, a portion of the software may be considered to be performance critical if the portion of the software is executed above a certain percentage of the time, for example, 80%. When this occurs, a weight of, for example, 5 may be added to the test's weight.

As another example, different categories of performance criticality may be defined, such as high, medium and low. These may be defined as follows: high-executed>90% of the time, medium-executed>80% and <90%, and low-executed<80% of the time and >70% of the time. Weights such as 5 for high, 3 for medium, and 1 for low may be added to the weights of tests that cause software within the above performance critical categories to be executed. Of course, this variation is not limited to the above categories and weights. Other categories and weights may also be used.

Another factor that may be used in weighing the tests in the above embodiments is the rate of fault detection for each test. Historical information pertaining to fault detection may be maintained for each of the software tests. A weight may be assigned for each given rate of fault detection. For example, a weight of 5 may be added for a test that historically has a high rate of fault detection, a weight of 3 may be added for a test that has a medium rate of faulty detection, and a weight of 1 may be added to tests that have a low rate of fault detection. Of course, other categories may be used, as well as more or fewer categories. Further, other numeric values may be used for weights for each category. It will be appreciated that the various criteria may take on different weights in a combined weighting calculation. For example, a particular weighting function may be defined combining various criterion such as those discussed above using weight coefficients to generate a weight for use in test prioritization.

Results

An illustrative embodiment of the invention using block coverage was tested on a number of binaries (machine language instructions in binary form) from a development environment. Two measurements are of particular interest:

The number of sequences of tests formed and the number of tests in each sequence; and Accuracy.

Figure 12:
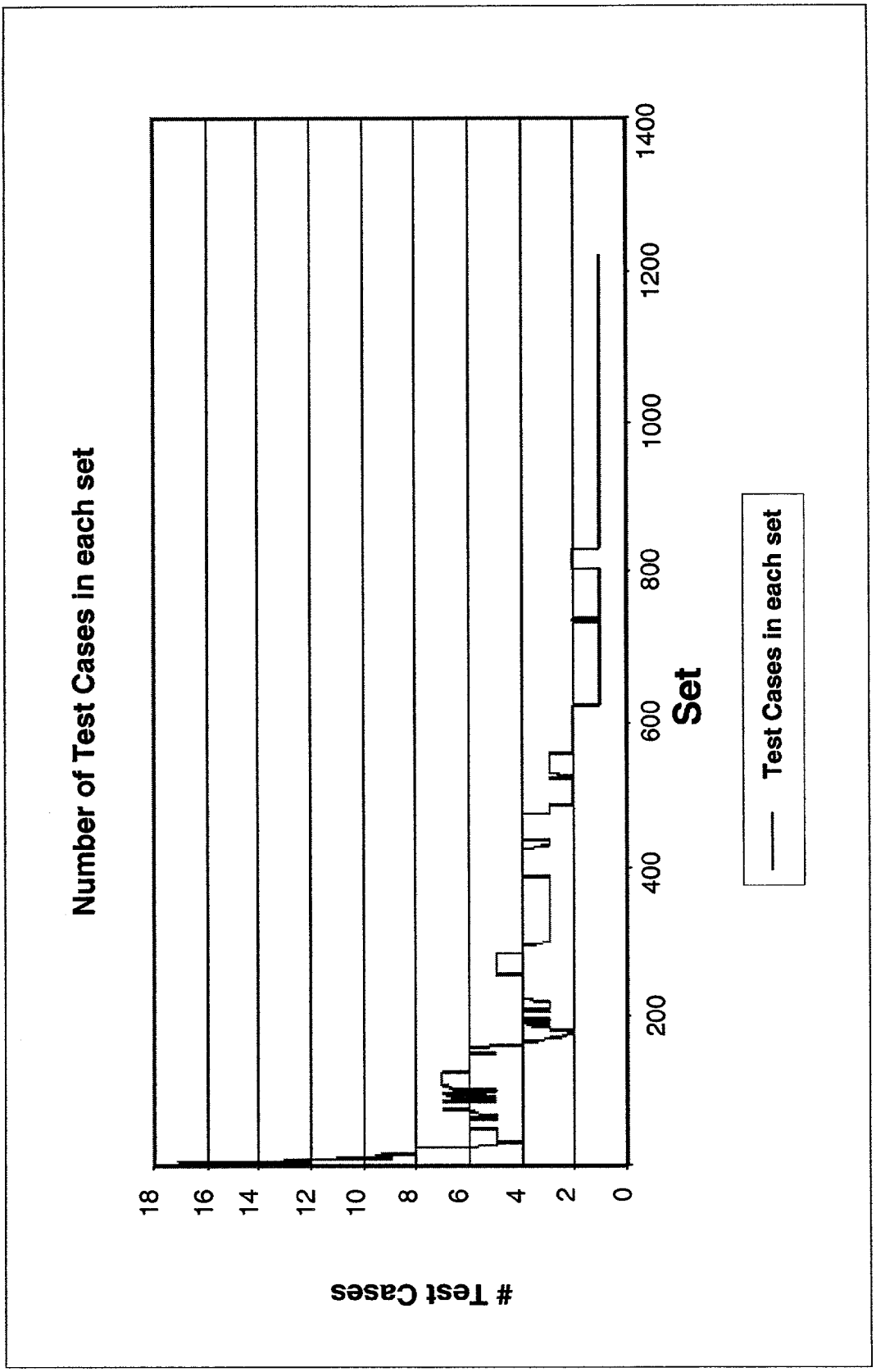
FIGS. 12–16 illustrate results of using an illustrative embodiment of the invention to prioritize software tests.
Figure 13:
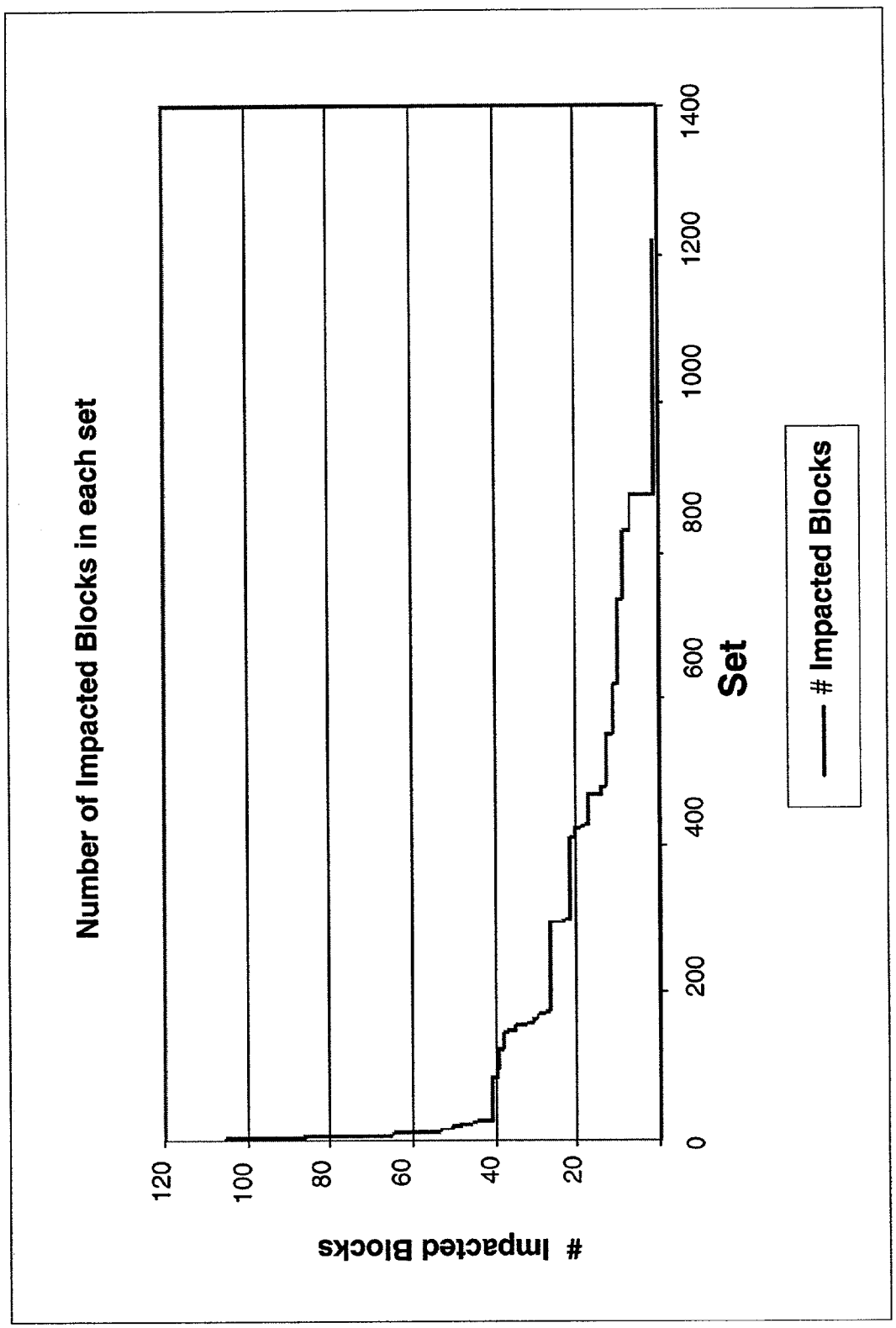

FIG. 12 is a graph showing the number of tests in each sequence or set. FIG. 13 is a graph showing the number of impacted blocks in each set. Applying the illustrative embodiment of FIGS. 6A–6C, 3,128 tests were prioritized into 1225 sequences. The first sequence, which provides maximum coverage of impacted blocks, contains only 16 tests. As FIG. 12 shows, the number of tests in each sequence falls sharply after the first few sequences because most of the changes were concentrated in one part of the program. Many of the latter sequences contained only one test. These tests covered a common routine that was modified, but did not cover much of other modified code. These tests were correctly prioritized by placing them toward the end of the tests, i.e., giving them a low priority.

FIG. 13 shows that the maximum number of impacted blocks was covered by the first few tests. After the first few tests, there is a sharp decline in the number of impacted blocks covered. The sequences toward the end of the tests cover the same single block.

Figure 14:
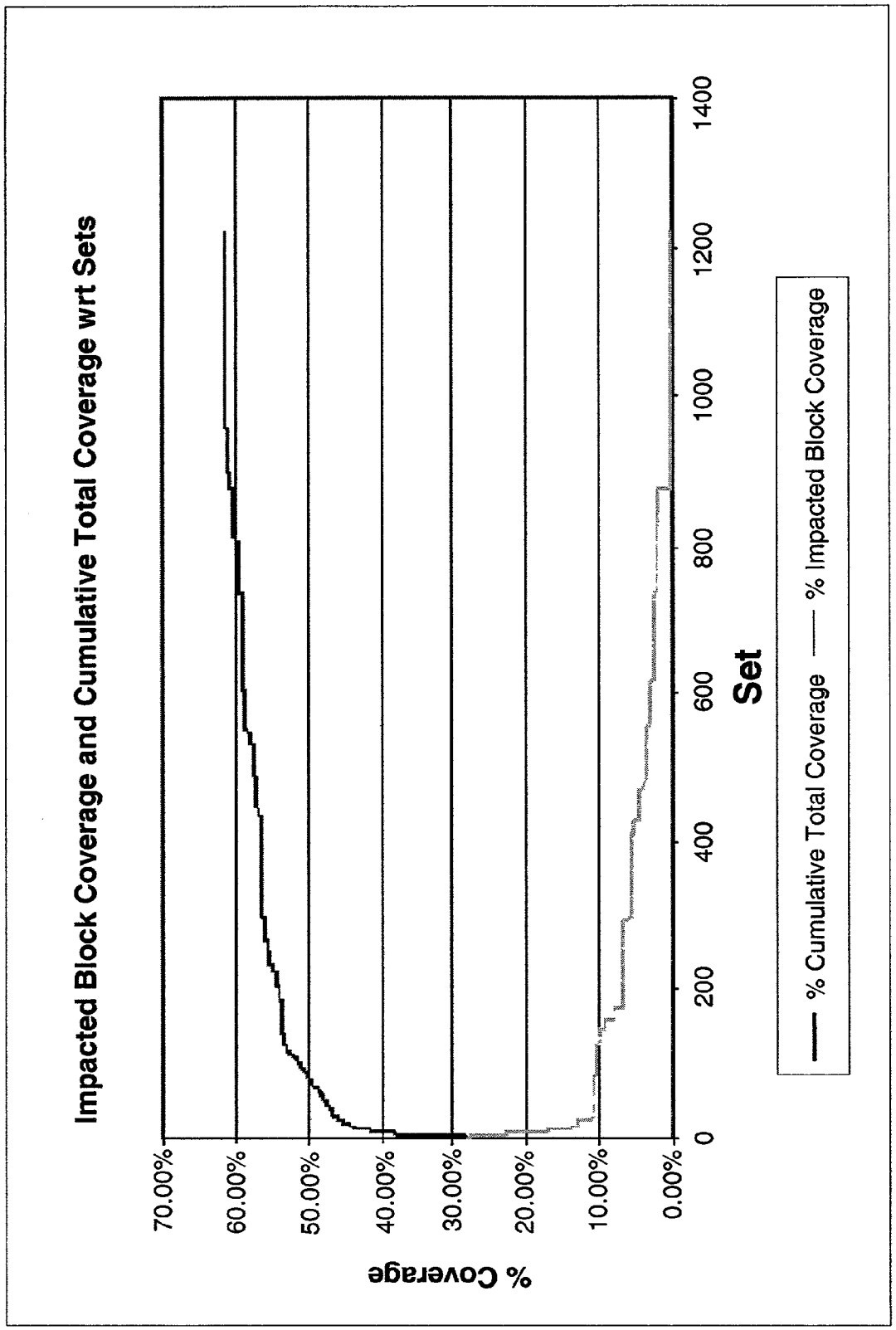

FIG. 14 shows the percentage coverage of impacted blocks attained by each sequence as well as the cumulative overall coverage attained while proceeding down the sequences of tests. As expected, the impacted block coverage is highest for the first sequence and decreases rapidly as the sequences progress. Although this illustrative embodiment used overall coverage to break ties, the overall coverage reached a maximum at a very fast pace.

In considering accuracy, the number of blocks that were predicted to be covered by a test that were, in fact, not covered and the number of blocks that were predicted to be not covered by a test, but were actually covered must be examined.

Figure 15:
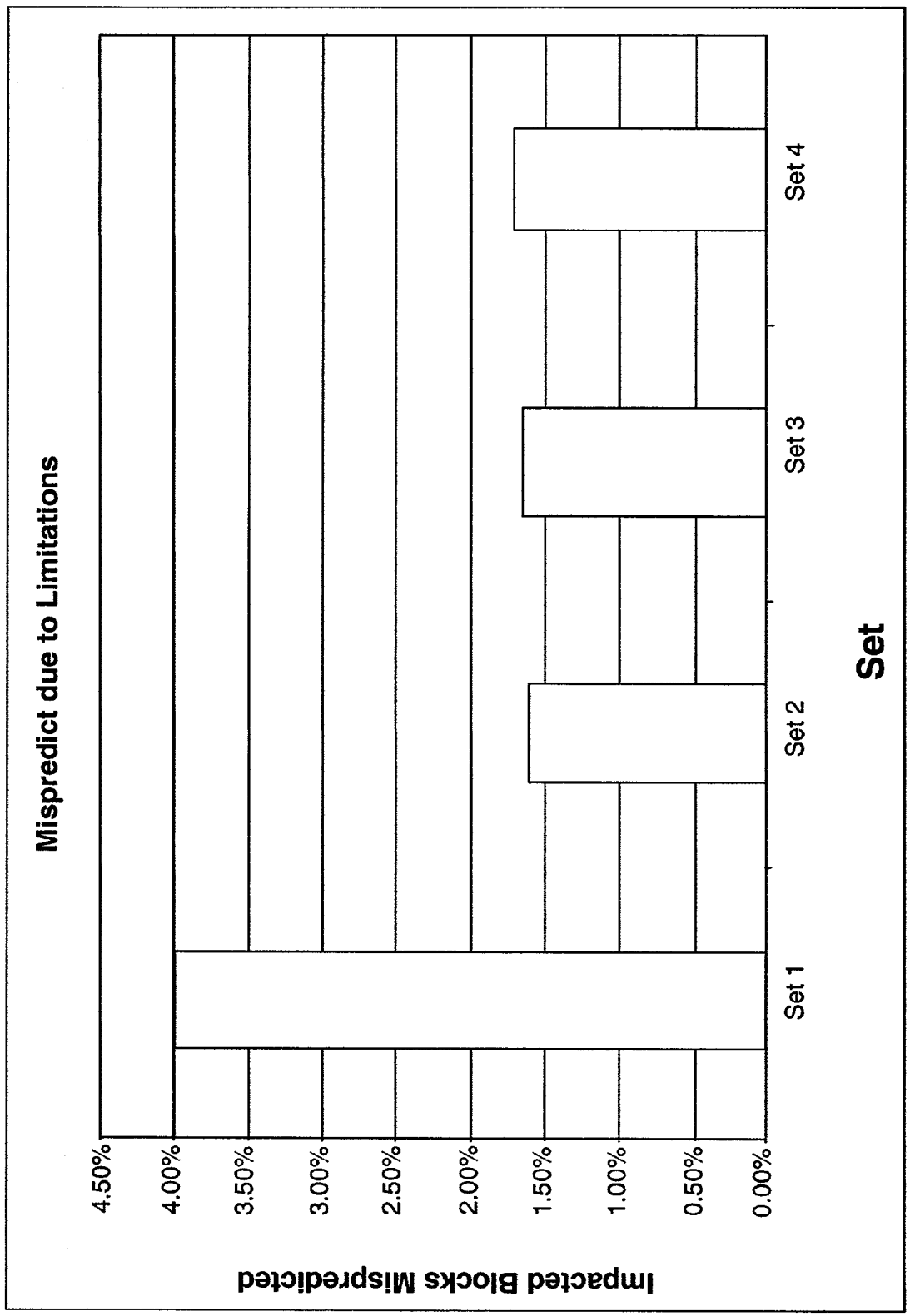

FIG. 15 shows the percentage of impacted blocks in the first four sequences of testing that were predicted to be covered by a test, but were in fact not covered. The error in predicting coverage was in the range of 1–4%. The misprediction occurred because there was a direct path from a predecessor to a successor block of a new block. The error could have been avoided by using arc coverage information to predict which arcs were likely to be executed.

Figure 16:
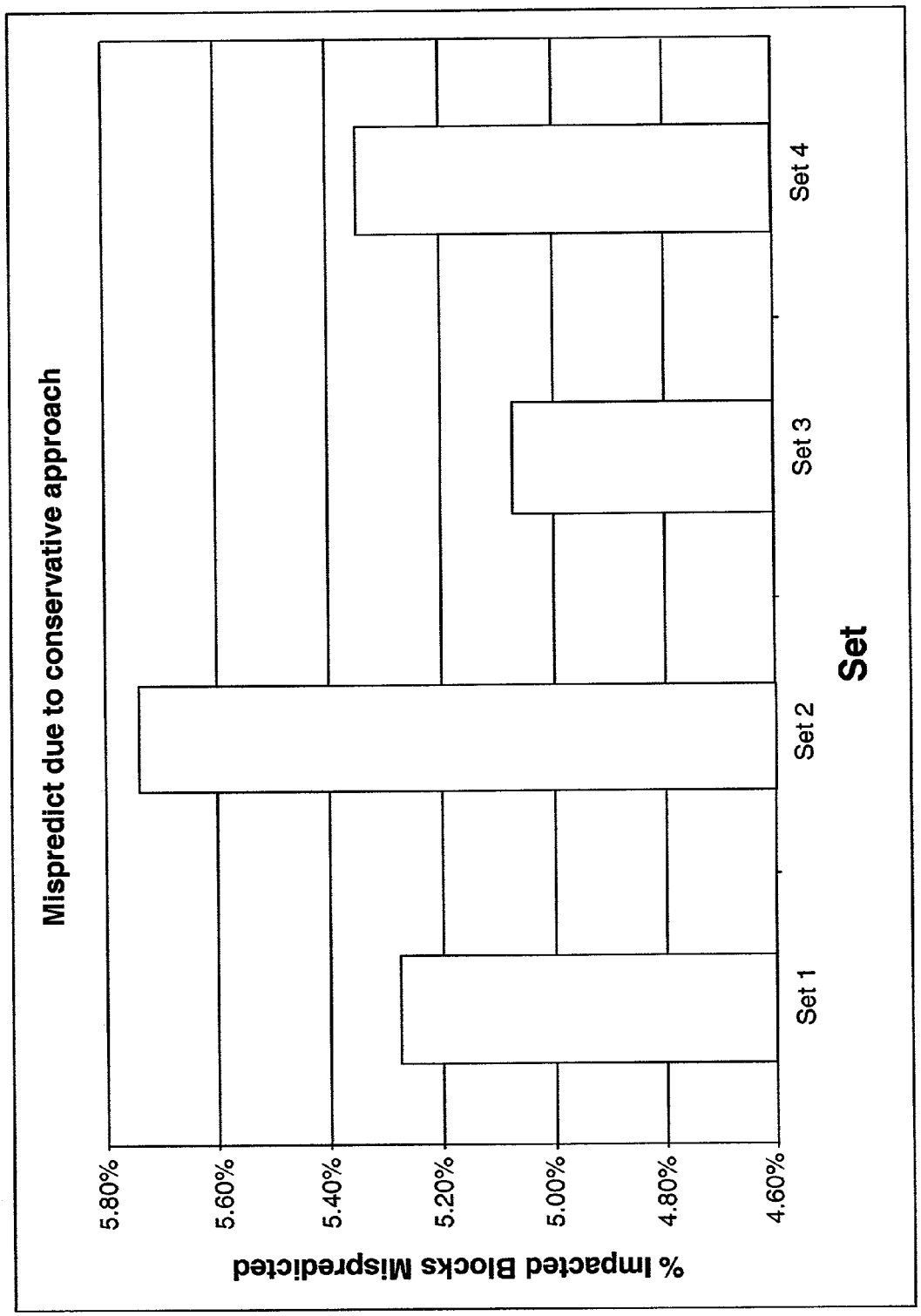

FIG. 16 shows the percentage of impacted blocks in the first four sequences that were predicted not to be covered by any test, but actually were covered. The error predicting coverage was in the range of about 5–6%. In these cases, a number of new blocks were inserted at the head of a procedure. When the procedures were called indirectly, no predecessors were detected. Therefore, the incorrect predictions were made. These errors could have been eliminated by using the variation that indicates new blocks as covered when at least one successor block is covered, skipping any intermediate new blocks.

Embodiments of the invention may be implemented in hardware, software, firmware or by-an application specific integrated circuit (ASIC). The firmware may be in a read only memory and the software may reside on any computer readable medium, such as read only memory, random access memory, removable or non-removable magnetic disk or removable optical disk.

The present invention has been described in terms of preferred and exemplary embodiments thereof Numerous other embodiments, modifications and variations within the scope and spirit of the appended claims will occur to persons of ordinary skill in the art from a review of this disclosure.

We claim as our invention:

1. A computer-implemented method of prioritizing software tests, the method comprising the steps of:
   (A) prioritizing software tests for software to be tested based on coverage indicators for the software tests and an indication of impacted areas of the software, each of the coverage indicators indicating which portions of the software are executed for a respective one of the software tests; and
   (B) generating a prioritized list of the software tests, the prioritized list including at least one test sequence, wherein:
   the portions of the software include at least one of a plurality of blocks, and
   the indication of impacted areas of the software indicates ones of the plurality of blocks that are modified or new with respect to a previous version of the software, wherein the step (A) comprises the steps of:
   (A1) computing a weight for each of the software tests, the weight being based on a number of the new and the modified blocks that are indicated as being executed by each respective one of the software tests;
   (A2) selecting a first test having a maximum weight among the software tests, wherein when two or more of the software tests have the same computed maximum weight, the step (A2) further comprises the steps of:
   (A2a) determining which one of the two or more of the software tests has a maximum overall coverage of the software to be tested; and
   (A2b) selecting as the first test, the one of the two or more software tests having the maximum overall coverage of the software to be tested; and
   (A3) adding the selected first test to a current test sequence.

2. The computer-implemented method of claim 1, wherein the blocks include blocks of binary code and each of the blocks has a single entry point and a single exit point.

3. The computer-implemented method of claim 1, wherein a coverage indicator of a new block indicates that the respective one of the software tests executes the new block when a predecessor block and a successor block of the new block have been indicated as being executed by the respective one of the software tests.

4. The computer-implemented method of claim 1, wherein a coverage indicator of a new block indicates that the respective one of the software tests executes the new block when a successor block of the new block has been indicated as being executed by the respective one of the software tests.

5. The computer-implemented method of claim 1, wherein:
   the step (A) comprises determining whether ones of the modified and the new blocks exist that are not indicated as being executed by any of the software tests, and
   the computer-implemented method further comprises the step (C) of generating a list of the ones of the modified and the new blocks that are not indicated as being executed by any of the software tests.

6. The computer-implemented method of claim 1, wherein the step (A) further comprises the steps of:
   (A4) removing from consideration the selected first software test and any of the new and the modified blocks that are indicated as being executed by the selected first test;
   (A5) computing a weight for each of the software tests under consideration, the weight being based on a number of the new and the modified blocks under consideration that are indicated as executed by each of the respective ones of the software tests;
   (A6) selecting a second test having a maximum weight among the software tests under consideration; and
   (A7) adding the selected second test to the current test sequence.

7. The computer-implemented method of claim 1, wherein the step (A1) includes adding to the weight of the respective one of the software tests when any of the new and the modified blocks that are indicated as being executed by the respective one of the software tests is in a performance critical part of the software to be tested.

8. The computer-implemented method of claim 1, wherein the step (A1) includes utilizing a rate of fault detection of each of the respective ones of the software tests when computing a respective weight.

9. The computer-implemented method of claim 1, wherein the coverage indicators indicate one or more arcs that are covered by each respective one of the software tests and the indication of impacted areas of the software further indicates ones of the arcs that are new or modified with respect to a previous version of the software.

10. The computer-implemented method of claim 9, wherein:
    the step (A) comprises determining whether ones of the arcs are not indicated as being taken by any of the software tests, and
    the computer-implemented method further comprising the step (C) of generating a list of the ones of the arcs that are not indicated as taken by any of the software tests.

11. The computer-implemented method of claim 9, wherein the step (A) comprises the steps of:
    (A1) computing a weight for each of the software tests, the weight being based on a number of the ones of the arcs that are indicated as taken by each respective one of the software tests;
    (A2) selecting a first test having a maximum weight among the software tests; and
    (A3) adding the selected first test to a current test sequence.

12. The computer-implemented method of claim 11, further comprising:
(A4) removing from consideration the selected first software test and any of the ones of the arcs that are indicated as taken by the selected first test;
(A5) computing a weight for each of the software tests under consideration, the weight being based on a number of the ones of the arcs under consideration that are indicated as taken by each of the respective ones of the software tests;
(A6) selecting a second test having a maximum weight among the software tests under consideration; and
(A7) adding the selected second test to the current test sequence.

13. A computer-implemented method of prioritizing software tests, the method comprising the steps of:
(A) prioritizing software tests for software to be tested based on coverage indicators for the software tests and an indication of impacted areas of the software, each of the coverage indicators indicating which portions of the software are executed for a respective one of the software tests; and
(B) generating a prioritized list of the software tests, the prioritized list including at least one test sequence, wherein:
the portions of the software include at least one of a plurality of blocks, and
the indication of impacted areas of the software indicates ones of the plurality of blocks that are modified or new with respect to a previous version of the software,
wherein the step (A) comprises the steps of:
(A1) computing a weight for each of the software tests, the weight being based on a number of the new and the modified blocks that are indicated as being executed by each respective one of the software tests;
(A2) selecting a first test having a maximum weight among the software tests, wherein when two or more of the software tests have a same computed maximum weight, the step (A2) further comprises the steps of:
(A2a) determining which one of the two or more of the software tests has a minimum execution time; and
(A2b) selecting as the first test, the one of the two or more software tests having the minimum execution time; and
(A3) adding the selected first test to a current test sequence.

14. A computer-readable medium having instructions stored thereon, such that when the instructions are loaded and executed by a processor, the processor is caused to perform the steps of:
(A) prioritizing software tests based on coverage indicators for the software tests and an indication of impacted areas of software to be tested, each of the coverage indicators indicating which portions of the software to be tested are executed for a respective one of the software tests; and
(B) generating a prioritized list of the software tests, the prioritized list including at least one test sequence, wherein:
the software to be tested includes a plurality of blocks,
each of the coverage indicators indicates at least one block of the plurality of blocks that is executed by a respective one of the software tests, and
the indication of impacted areas indicates ones of the plurality of blocks that are modified or new with respect to a previous version of the software to be tested,
wherein the step (A) comprises the steps of:
(A1) computing a weight for each of the software tests, the weight being based on a number of the new and the modified blocks that are indicated as being executed by each respective one of the software tests;
(A2) selecting a first test having a maximum weight among the software tests, wherein when two or more of the software tests have the same computed maximum weight, the step (A2) further comprises the steps of:
(A2a) determining which one of the two or more of the software tests has a maximum overall coverage of the software to be tested; and
(A2b) selecting as the first test, the one of the two or more software tests having the maximum overall coverage of the software to be tested; and
(A3) adding the selected first test to a current test sequence.

15. A computer-readable medium having instructions stored thereon, such that when the instructions are loaded and executed by a processor, the processor is caused to perform the steps of:
(A) prioritizing software tests based on coverage indicators for the software tests and an indication of impacted areas of software to be tested, each of the coverage indicators indicating which portions of the software to be tested are executed for a respective one of the software tests; and
(B) generating a prioritized list of the software tests, the prioritized list including at least one test sequence, wherein:
the software to be tested includes a plurality of blocks,
each of the coverage indicators indicates at least one block of the plurality of blocks that is executed by a respective one of the software tests, and
the indication of impacted areas indicates ones of the plurality of blocks that are modified or new with respect to a previous version of the software to be tested,
wherein the step (A) comprises the steps of:
(A1) computing a weight for each of the software tests, the weight being based on a number of the new and the modified blocks that are indicated as being executed by each respective one of the software tests;
(A2) selecting a first test having a maximum weight among the software tests, wherein when two or more of the software tests have the same computed maximum weight, the step (A2) further comprises the steps of:
(A2a) determining which one of the two or more of the software tests has a minimum execution time; and
(A2b) selecting as the first test, the one of the two or more software tests having the minimum execution time; and
(A3) adding the selected first test to a current test sequence.

16. The computer-readable medium of claim 15, wherein the blocks include blocks of binary code and each of the blocks has a single entry point and a single exit point.

17. The computer-readable medium of claim 15, wherein a coverage indicator of a new block indicates that the respective one of the software tests executes the new block when a predecessor block and a successor block of the new block have been indicated as being executed by the respective one of the software tests.

18. The computer-readable medium of claim 15, wherein a coverage indicator of a new block indicates that the respective one of the software tests executes the new block when a successor block of the new block has been indicated as being executed by the respective one of the software tests.

19. The computer-readable medium of claim 15, wherein:
the step (A) comprises determining whether ones of the modified and the new blocks exist that are not indicated as being executed by any of the software tests, and
the processor further performs the step (C) of outputting a list of the ones of the modified and the new blocks that are not indicated as being executed by any of the software tests.

20. The computer-readable medium of claim 15, wherein the step (A) further comprises the steps of:
(A4) deleting from consideration the selected first software test and any of the new and the modified blocks that are indicated as being executed by the selected first test;
(A5) computing a weight for each of the software tests under consideration, the weight being based on a number of the new and the modified blocks under consideration that are indicated as being executed by each of the respective ones of the software test;
(A6) selecting a second test having a maximum weight among the software tests under consideration; and
(A7) adding the selected second test to the current test sequence.

21. The computer-readable medium of claim 15, wherein the step (A1) includes adding to the weight of the respective one of the software tests when any of the new and the modified blocks that are indicated as being executed by the respective one of the software tests are in a performance critical part of the software to be tested.

22. The computer-readable medium of claim 15, wherein the step (A1) includes considering a rate of fault detection of each of the respective ones of the software tests when computing a respective weight.

23. The computer-readable medium of claim 15, wherein the coverage indicators indicate one or more arcs that are covered by each respective one of the software tests and the indication of impacted areas further indicates ones of the arcs tat branch to or from a block that is new or modified with respect to a previous version of the software to be tested.

24. The computer-readable medium of claim 23, wherein:
the step (A) comprises determining whether the ones of the arcs are not indicated as being caused to be taken by any of the software tests, and
the processor further performing the step (C) of outputting a list of the ones of the arcs that are not caused to be taken by any of the software tests.

25. The computer-readable medium of claim 23, wherein the step (A) comprises the steps of:
(A1) computing a weight for each of the software tests, the weight being based on a number of the ones of the arcs that are indicated as being caused to be taken by each respective one of the software tests;
(A2) selecting a first test having a maximum weight among the software tests; and
(A3) adding the selected first test to a current test sequence.

26. The computer-readable medium of claim 25, wherein the step (A) farther comprises the step of:
(A4) deleting from consideration the selected first software test and any of the ones of the arcs that are indicated as caused to be taken by the selected first test;
(A5) computing a weight for each of the software tests under consideration, the weight being based on a number of the ones of the arcs under consideration that are indicated as caused to be taken by each of the respective ones of the software tests;
(A6) selecting a second test having a maximum weight among the software tests under consideration; and
(A7) adding the selected second test to the current test sequence.

27. A computer system for prioritizing software tests, the computer system comprising:
a prioritizer for prioritizing the software tests based on coverage indicators for the software tests and an indication of impacted areas of software to be tested, each of the coverage indicators indicating which portions of the software to be tested are caused to be executed by a respective one of the software tests; and
an outputter for outputting a prioritized list of the software tests, the prioritized list including at least one test sequence, wherein:
the software to be tested includes a plurality of blocks,
each of the coverage indicators indicates at least one block of the plurality of blocks that is caused to be executed by a respective one of the software tests, and
the indication of impacted areas indicates ones of the plurality of blocks that are modified or new with respect to a previous version of the software to be tested,
wherein the prioritizer further comprises:
a weight determiner for determining a weight for each of the software tests, the weight being based on a number of the new and the modified blocks that are indicated as being caused to be executed by each respective one of the software tests;
a selector for selecting a first test having a maximum weight among the software tests, wherein when two or more of the software tests have the same computed maximum weight, the selector is further adapted for:
determining which one of the two or more of the software tests has a maximum overall coverage of the software to be tested; and
selecting as the first test, the one of the two or more software tests having the maximum overall coverage of the software to be tested; and
a test adder for adding the selected first test to a current test sequence.

28. The computer system of claim 27, wherein the blocks include blocks of binary code and each of the blocks have a single entry point and a single exit point.

29. The computer system of claim 27 wherein a coverage indicator of a new block indicates that the respective one of the software tests executes the new block when a predecessor block and a successor block of the new block have been indicated as being executed by the respective one of the software tests.

30. The computer system of claim 27, wherein a coverage indicator of a new block indicates that the respective one of the software tests executes the new block when a successor block of the new block has been indicated as being executed by the respective one of the software tests.

31. The computer system of claim 27 wherein:
the prioritizer comprises a block determiner for determining whether ones of the modified and the new blocks exist that are not indicated as being caused to be executed by any of the software tests, and
the outputter is further adapted for outputting a list of the ones of the modified and the new blocks that are determined by the block determiner as not being caused to be executed by any of the software tests.

32. The computer system of claim 27, wherein the weight determiner is further adapted for adding to the weight of the respective one of the software tests when any of the new and the modified blocks that are indicated as being caused to be executed by the respective one of the software tests is in a performance critical part of the software to be tested.

33. The computer system of claim 27, wherein the weight determiner is further adapted for considering a rate of fault detection of each of the respective ones of the software tests when computing a respective weight.

34. The computer system of claim 27, wherein the coverage indicators indicate one or more arcs that are covered by each respective one of the software tests and the indication of impacted areas further indicates ones of the arcs that branch to or from a block that is new or modified with respect to a previous version of the software to be tested.

35. The computer system of claim 34, wherein:
the prioritizer is further adapted for determining whether the ones of the arcs are not indicated as being caused to be taken by any of the software tests, and
the outputter is further adapted for outputting a list of the ones of the arcs that are not indicated as being caused to be taken by any of the software tests.

36. The computer system of claim 34, wherein the prioritizer further comprises:
a weight determiner for determining a weight for each of the software tests, the weight being based on a number of the ones of the arcs that are indicated as being caused to be taken by each respective one of the software tests;
a selector for selecting a first test having a maximum weight among the software tests; and
a test adder for adding the selected first test to a current test sequence.

37. A computer system for prioritizing software tests, the computer system comprising:
a prioritizer for prioritizing the software tests based on coverage indicators for the software tests and an indication of impacted areas of software to be tested, each of the coverage indicators indicating which portions of the software to be tested are caused to be executed by a respective one of the software tests; and
an outputter for outputting a prioritized list of the software tests, the prioritized list including at least one test sequence, wherein:
the software to be tested includes a plurality of blocks,
each of the coverage indicators indicates at least one block of the plurality of blocks that is caused to be executed by a respective one of the software tests, and
the indication of impacted areas indicates ones of the plurality of blocks that are modified or new with respect to a previous version of the software to be tested,
wherein the prioritizer further comprises:
a weight determiner for determining a weight for each of the software tests, the weight being based on a number of the new and the modified blocks that are indicated as being caused to be executed by each respective one of the software tests;
a selector for selecting a first test having a maximum weight among the software tests, wherein when two or more of the software tests have the same computed maximum weight, the selector is further adapted for:
determining which one of the two or more of the software tests has a minimum execution time; and
selecting as the first test, the one of the two or more software tests having the minimum execution time; and
a test adder for adding the selected first test to a current test sequence.

* * * * *